United States Patent [19]

Iwasaki et al.

[11] Patent Number: 5,475,466
[45] Date of Patent: Dec. 12, 1995

[54] CAMERA HAVING TARGET FOLLOW UP FUNCTION

[75] Inventors: Hiroyuki Iwasaki, Kawasaki; Tadao Takagi, Yokohama, both of Japan

[73] Assignee: Nikon Corporation, Tokyo, Japan

[21] Appl. No.: 187,310

[22] Filed: Jan. 27, 1994

[30] Foreign Application Priority Data

Feb. 2, 1993 [JP] Japan .................................... 5-039367
Feb. 17, 1993 [JP] Japan .................................... 5-027066

[51] Int. Cl.$^6$ ...................................................... G03B 7/08
[52] U.S. Cl. .......................................... 354/432; 354/195.1
[58] Field of Search .................................... 354/430, 432, 354/403, 195.1

[56] References Cited

U.S. PATENT DOCUMENTS

| | | | |
|---|---|---|---|
| 4,929,844 | 5/1990 | Miyazaki | 354/432 X |
| 5,031,049 | 7/1991 | Toyama et al. | 354/430 X |
| 5,196,929 | 3/1993 | Miyasaka | 354/430 X |
| 5,210,559 | 5/1993 | Ohki | 354/430 X |
| 5,210,566 | 5/1993 | Nishida | 354/402 |
| 5,255,044 | 10/1993 | Ishiguro | 354/430 X |
| 5,349,415 | 9/1994 | Nishida | 354/432 |

FOREIGN PATENT DOCUMENTS

| | | |
|---|---|---|
| 56-86594 | 7/1981 | Japan . |
| 2246261 | 1/1992 | United Kingdom . |

*Primary Examiner*—Russell E. Adams
*Attorney, Agent, or Firm*—Oliff & Berridge

[57] ABSTRACT

Normally, movement of an object to be photographed is detected based upon the brightness information output by a photometric means, and the object to be photographed is followed up. During the exposure process the photometric means cannot perform photometry, and therefore the movement of the object to be photographed during exposure is predicted based upon the movement information for the object to be photographed detected before the start of the exposure process, and the position of the object to be photographed after the conclusion of the exposure process is obtained. When the exposure process has been completed, follow up of the object to be photographed is restarted from the predicted position which has been calculated. By doing this, the object to be photographed is not lost sight of after the exposure process has been completed, and it is possible to continue follow up of the object to be photographed from its predicted position.

Further, when follow up of the object to be photographed by the follow up means has become impossible, forcibly the initial state before the start of follow up may be returned to. By doing this, the follow up target object can be again discerned in the initial state etc., and the photographer is able quickly to proceed to the next action.

40 Claims, 25 Drawing Sheets

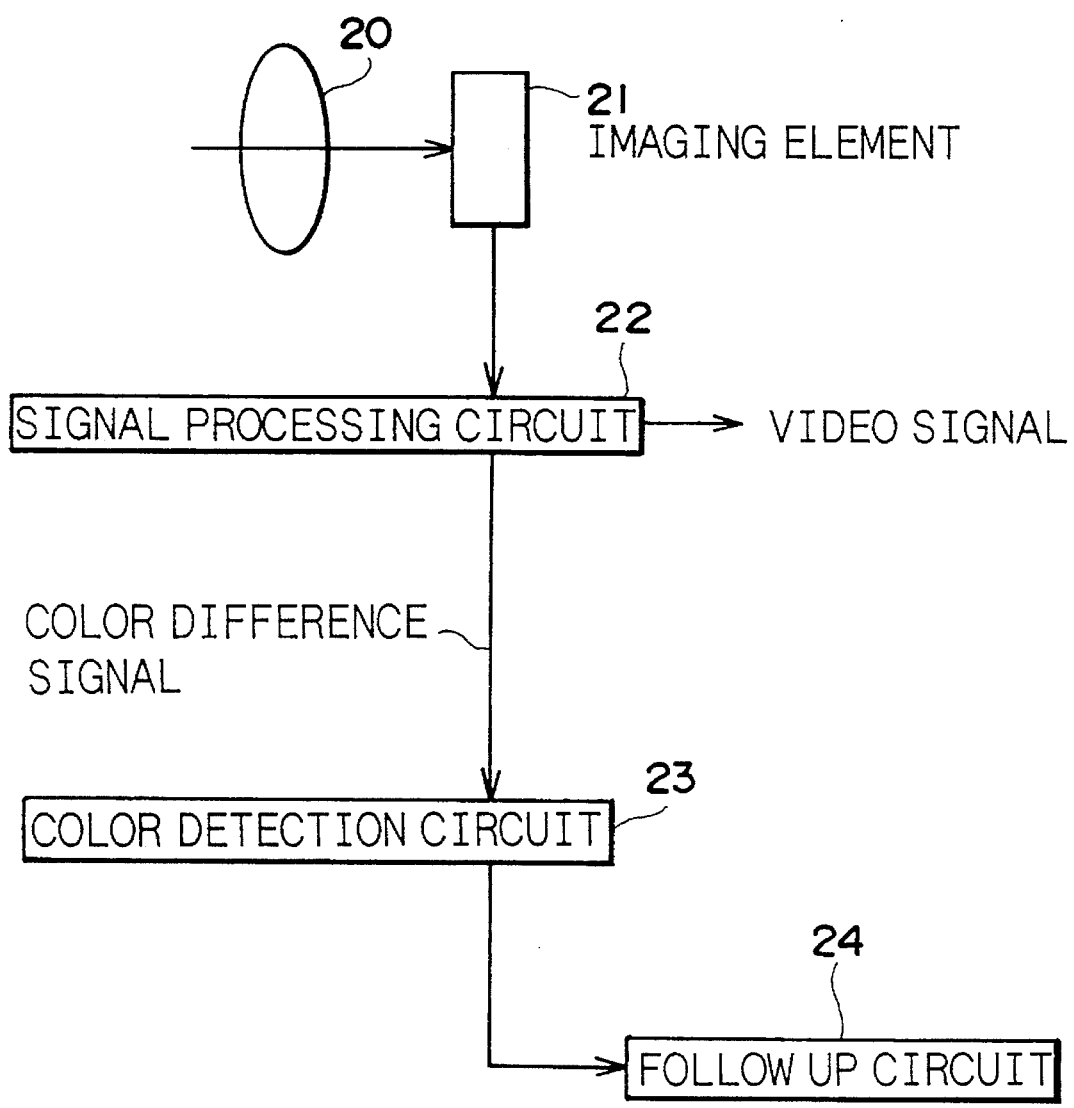

F I G. 19
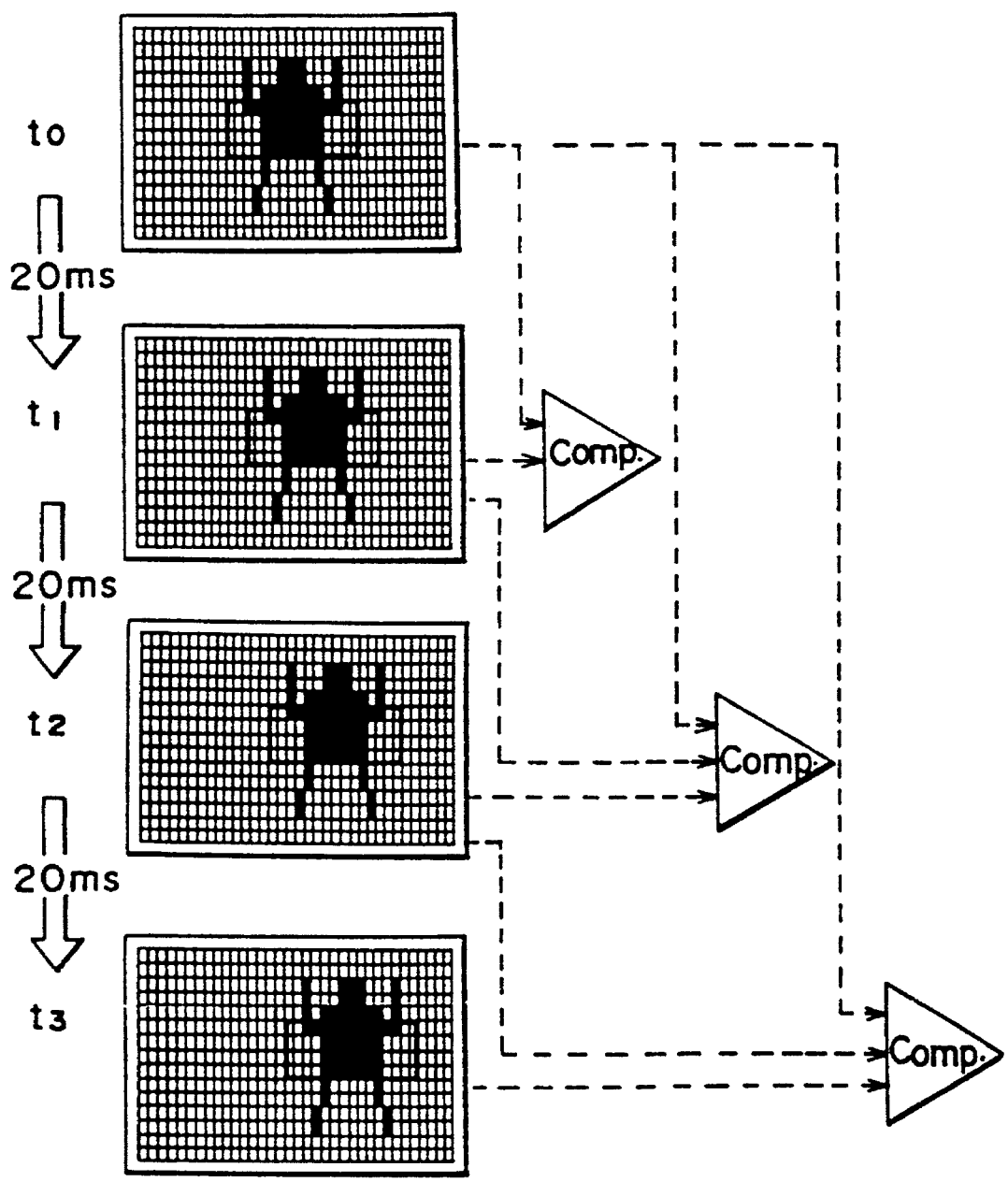

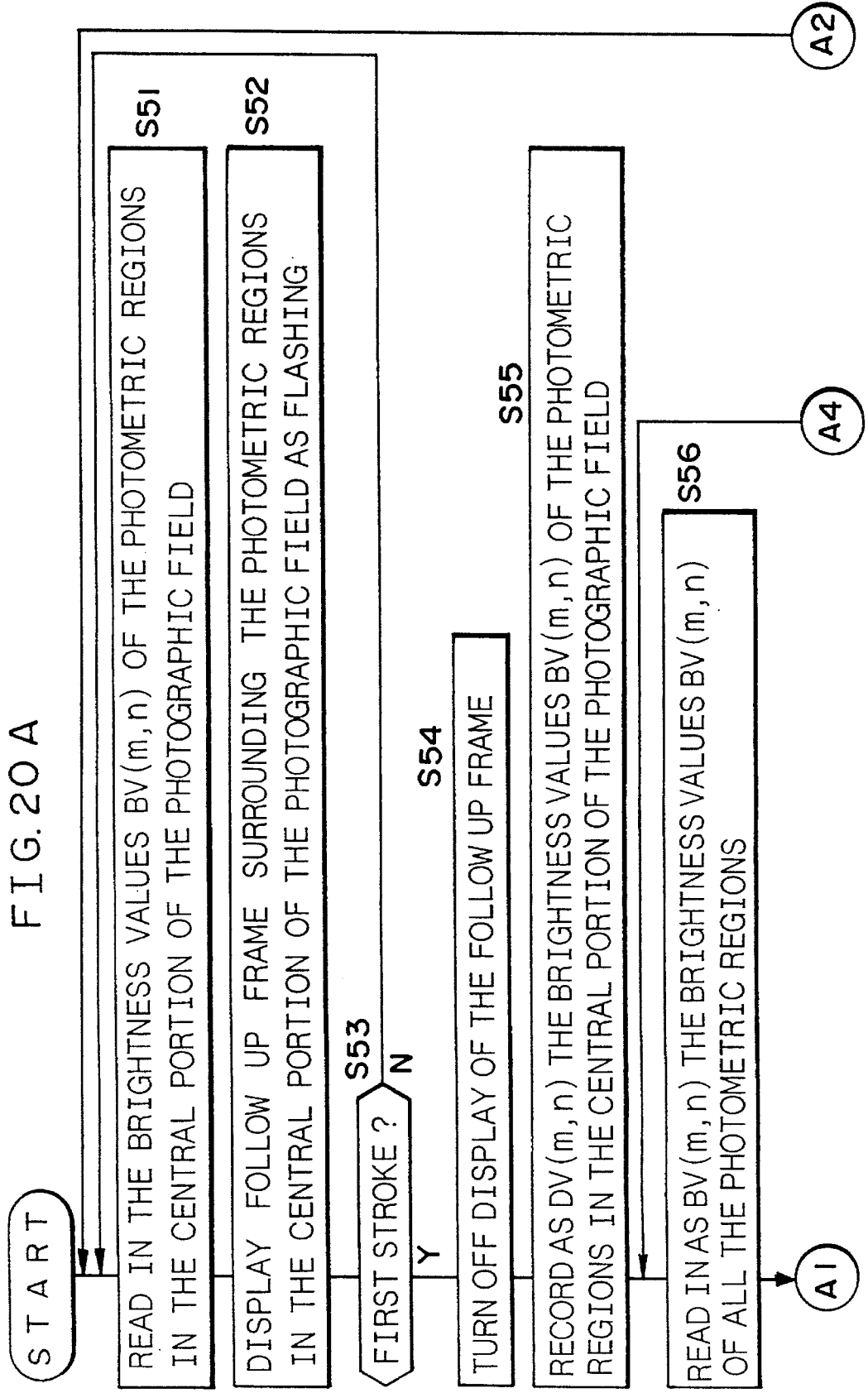

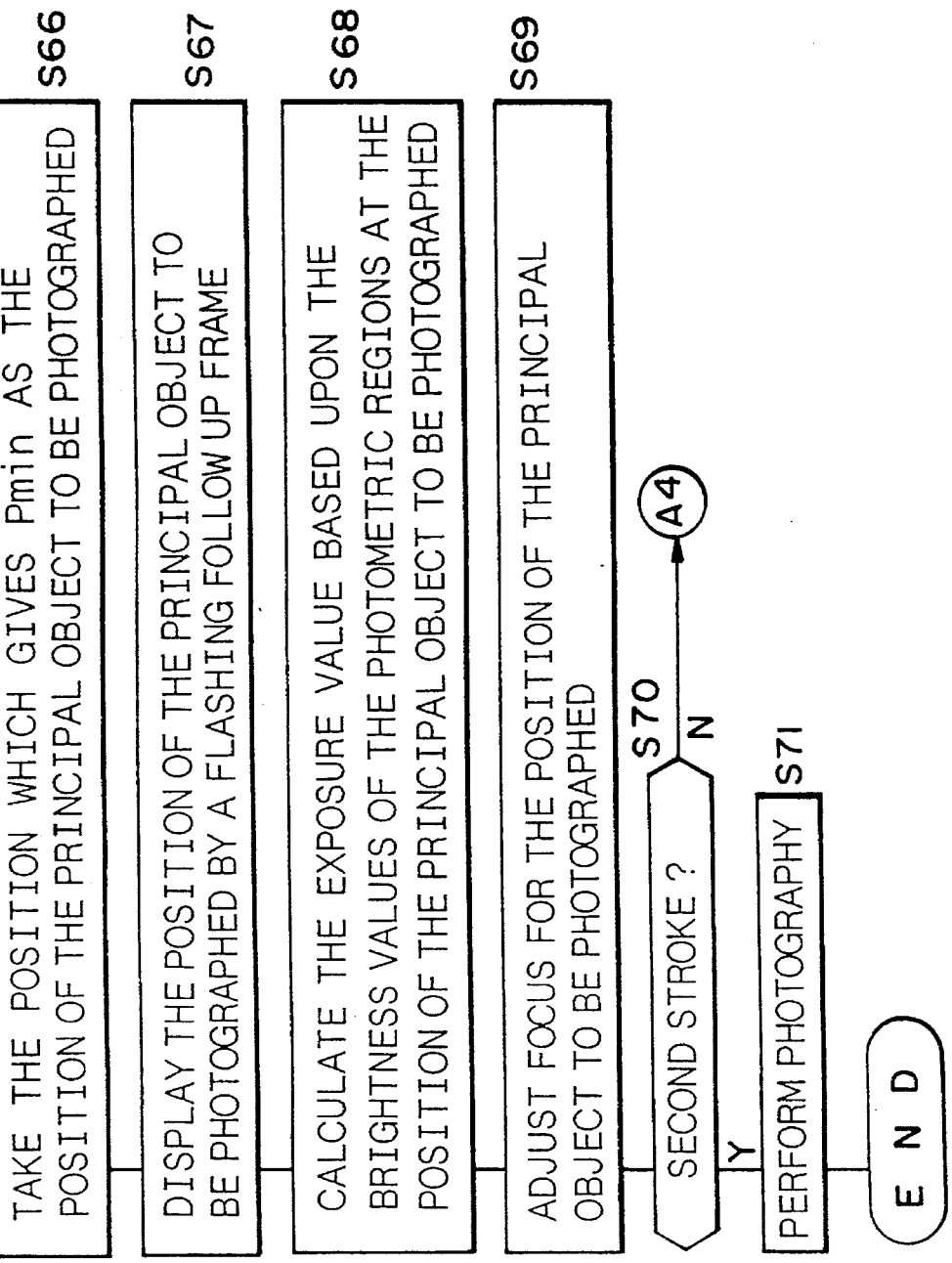

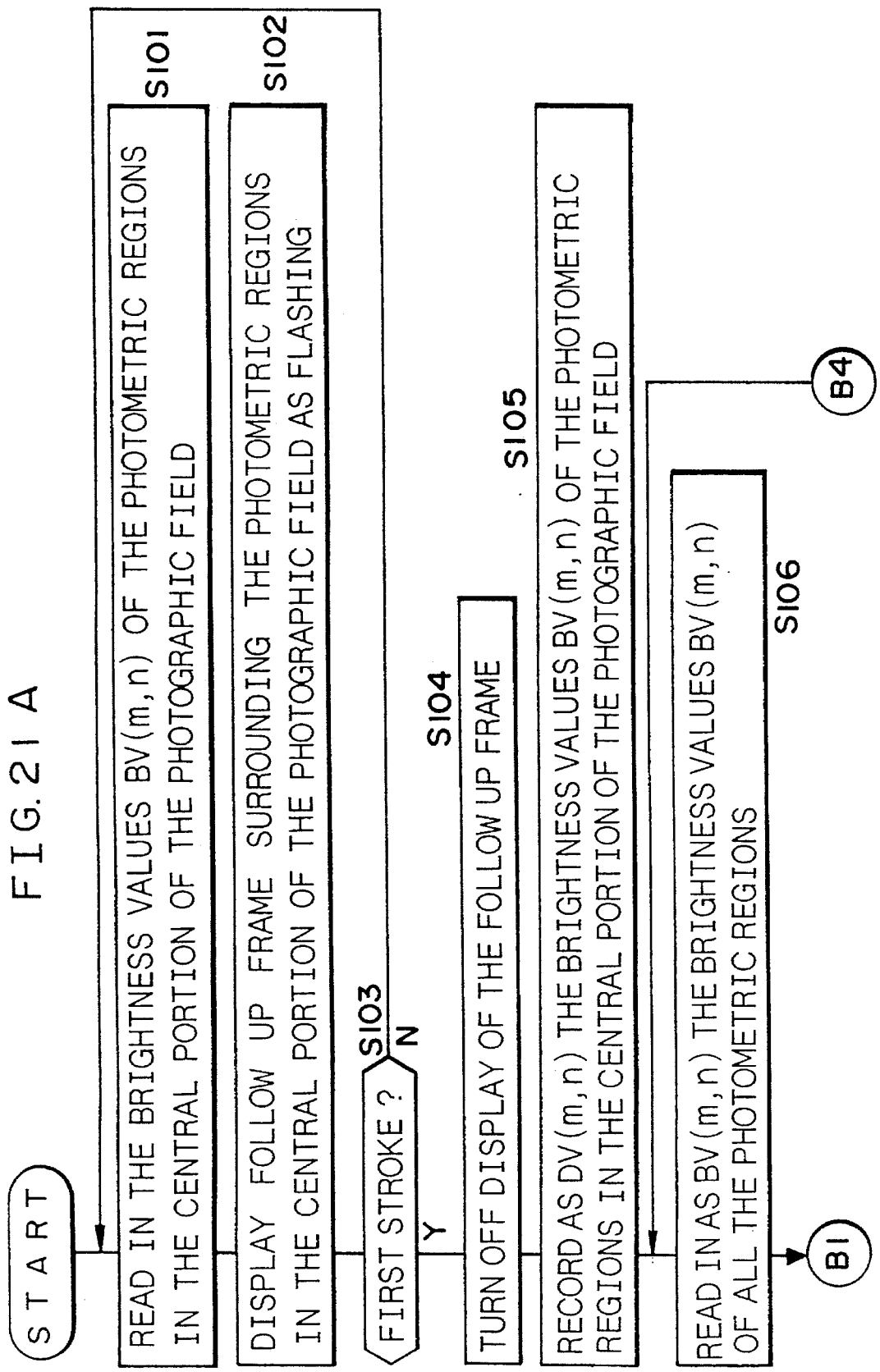

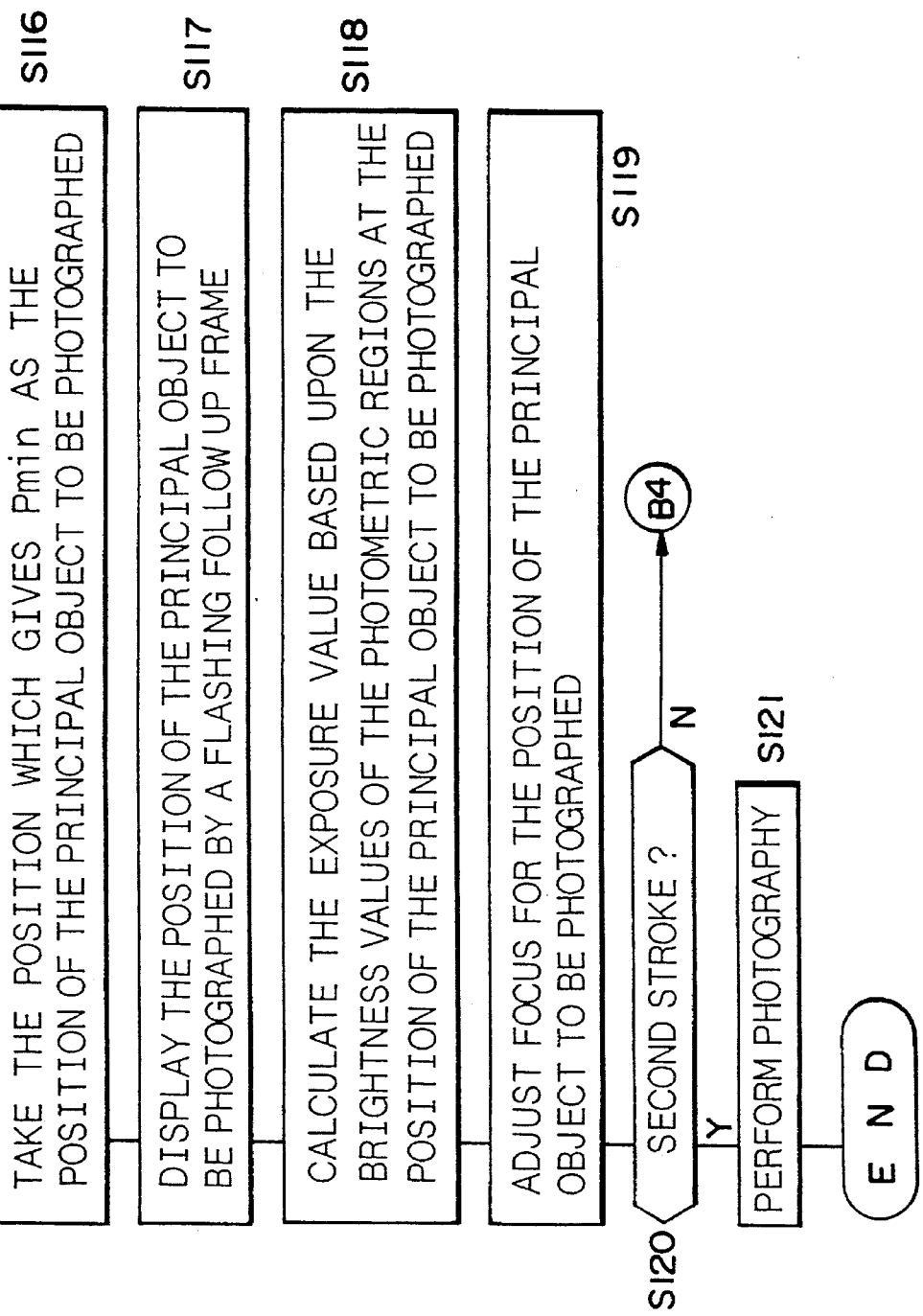

CAMERA HAVING TARGET FOLLOW UP FUNCTION

BACKGROUND OF THE INVENTION

1. Field of the Invention

The present invention relates to a camera, having a target follow up function, which automatically follows up a moving object to be photographed.

2. Related Background Art

As a device which automatically follows up an object to be photographed which is moving, and which performs focus detection and focus adjustment, an automatic follow up focus detection device is known (refer to U.S. Pat. No. 5,031,049). The overall construction of this device is shown in FIG. 8. A ray bundle from the object to be photographed which has passed through a photographic lens 20 is led to and focused upon an imaging element 21 which is made up from a plurality of charge accumulation type photoelectric conversion elements. The imaging element 21 outputs object to be photographed image signals which correspond to the distribution of light intensity in this image of the object to be photographed to a signal processing circuit 22 in time series. The signal processing circuit 22 converts these object to be photographed image signals into a video signal and outputs them, and at the same time outputs color difference signals (R-Y) and (B-Y) to a color detection circuit 23. This color detection circuit 23 detects color information relating to the object to be photographed, and a follow up circuit 24 records this detected color information as characteristic information of the object to be photographed. Further, this follow up circuit 24 compares this color information which is recorded as characteristic information of the object to be photographed and the color information newly detected by the color detection circuit 23, and based upon the result of this comparison determines whether or not movement of the object to be photographed has occurred. And, when the target object to be photographed has moved, the follow up circuit 24 moves the focus detection region to the position to which said target object has moved, and performs focus detection and focus adjustment.

However, when an attempt is made to apply the above described prior art for follow up of an object to be photographed to a single lens reflex camera which uses silver halide film, since an electrical signal representing an image of the object to be photographed for performing follow up cannot be obtained from the silver halide film, it is necessary to provide a separate imaging element for follow up of the object to be photographed.

However, since a single lens reflex camera is constructed so that a ray bundle from the object to be photographed which has passed through a photographic lens is reflected from a quick return mirror and is directed to the eyeball of the photographer via an optical system including a pentaprism or the like provided in the upper portion of the camera, it is necessary to provide the photometric element at a position after the light from the object to be photographed has passed through the pentaprism. Further, with a single lens reflex camera, in order for a light bundle from the object to be photographed which has passed through the photographic lens to reach the surface of the film directly during the operation of exposure, the quick return mirror is raised and is removed from the light path between the photographic lens and the surface of the film at this time. Accordingly, if the imaging element is provided at a position after the light from the object to be photographed has passed through the pentaprism, during the exposure process detection of an image of the object to be photographed by the imaging element is temporarily interrupted. As a result, if the object to be photographed continues to move during the exposure process as well, after the exposure has been completed the object to be photographed is lost sight of, and the problem arises that continued follow up becomes impossible.

Further, a correlation follow up device is per se known (refer to Japanese laid-open Application No. 56-86594) which performs correlation calculation between two sets of image data representing the object to be photographed which are detected at different time points by the imaging element, and which follows up the target object to be photographed within the visual field of the imaging element. However, with this device, there is no consideration of any measures to be taken when the target object to be photographed is lost sight of.

SUMMARY OF THE INVENTION

The objective of the present invention is to provide a camera having the function of following up a target object to be photographed, which can continue the following up of the target object after the process of exposure has been completed without losing sight of it, even if the target object moves during exposure.

In order to attain the above described objective, the camera having a target follow up function according to the present invention comprises: a photometric means, which performs photometry on a plurality of regions into which the photographic field is divided, and which outputs information representing the brightness of each of said regions; a follow up means, which detects the movement of an object to be photographed based upon the brightness information output by said photometric means, and which follows up said object to be photographed; and a prediction means which, during the time period while said photometric means cannot perform photometry, predicts the movement of said object to be photographed based upon the movement information for said object to be photographed detected by said follow up means, and which obtains the position of said object to be photographed for when photometry by said photometric means recommences.

Normally, movement of the object to be photographed is detected based upon the brightness information output by said photometric means, and the object to be photographed is followed up. During the exposure process said photometric means cannot perform photometry, and therefore the movement of said object to be photographed during this time period is predicted based upon the movement information for said object to be photographed detected by said follow up means, and the position of said object to be photographed after the conclusion of the exposure process is obtained. By doing this, the object to be photographed is not lost sight of after the exposure process is completed, and it is possible to continue follow up of the object to be photographed from its predicted position after the exposure process is completed.

Further, another objective of the present invention is to provide a camera having the function of following up a target object to be photographed, which, even when the object to be photographed is lost sight of while it is being followed up, performs an appropriate corresponding operation, so that the photographer can quickly proceed to the next action.

In order to attain the above described objective, the camera having a target follow up function according to the present invention comprises: a photometric means, which performs photometry on a plurality of regions into which the photographic field is divided, and which outputs information representing the brightness of each of said regions; a follow up means, which in its initial state discerns as a follow up target object an object to be photographed which is in a predetermined region of the photographic field, and which detects the movement of said object to be photographed based upon the brightness information output by said photometric means, and follows up said object to be photographed; and a resumption means, which, when follow up of said object to be photographed by said follow up means has become impossible, returns said follow up means to its said initial state.

Normally, movement of the object to be photographed is detected based upon the brightness information output by said photometric means, and the object to be photographed is followed up. When follow up of said object to be photographed by said follow up means has become impossible, said resumption means returns to its said initial state. By doing this, the follow up target object can be again discerned in the initial state etc., and the photographer is able quickly to proceed to the next action.

Further, in order to attain the above described objective in an alternative manner, the camera having a target follow up function according to the present invention may comprise: a photometric means, which performs photometry on a plurality of regions into which the photographic field is divided, and which outputs information representing the brightness of each of said regions; a follow up means, which in its initial state discerns as a follow up target object an object to be photographed which is in a predetermined region of the photographic field, and which detects the movement of said object to be photographed based upon the brightness information output by said photometric means, and follows up said object to be photographed; and a standby means, which, when follow up of said object to be photographed by said follow up means has become impossible, stands said follow up means by at the position at which follow up has become impossible until follow up becomes possible again.

Normally, movement of the object to be photographed is detected based upon the brightness information output by said photometric means, and the object to be photographed is followed up. When follow up of said object to be photographed by said follow up means has become impossible, said standby means stands said follow up means by at the position at which follow up has become impossible until follow up becomes possible again. By doing this, it is possible quickly and easily to recommence following up the object to be photographed, when follow up again becomes possible.

BRIEF DESCRIPTION OF THE DRAWINGS

FIG. 8 is a functional block diagram showing the construction of a prior art video camera having a target object follow up function;

FIG. 19 is a figure showing the gist of the follow up process for a moving target object;

FIGS. 20A through 20C are flow charts showing a first variant of the target object follow up operation of the second preferred embodiment; and:

FIGS. 21A through 21C are flow charts showing a second variant of the target object follow up operation of the second preferred embodiment.

DESCRIPTION OF THE PREFERRED EMBODIMENTS

Preferred Embodiment 1

Figure 1:
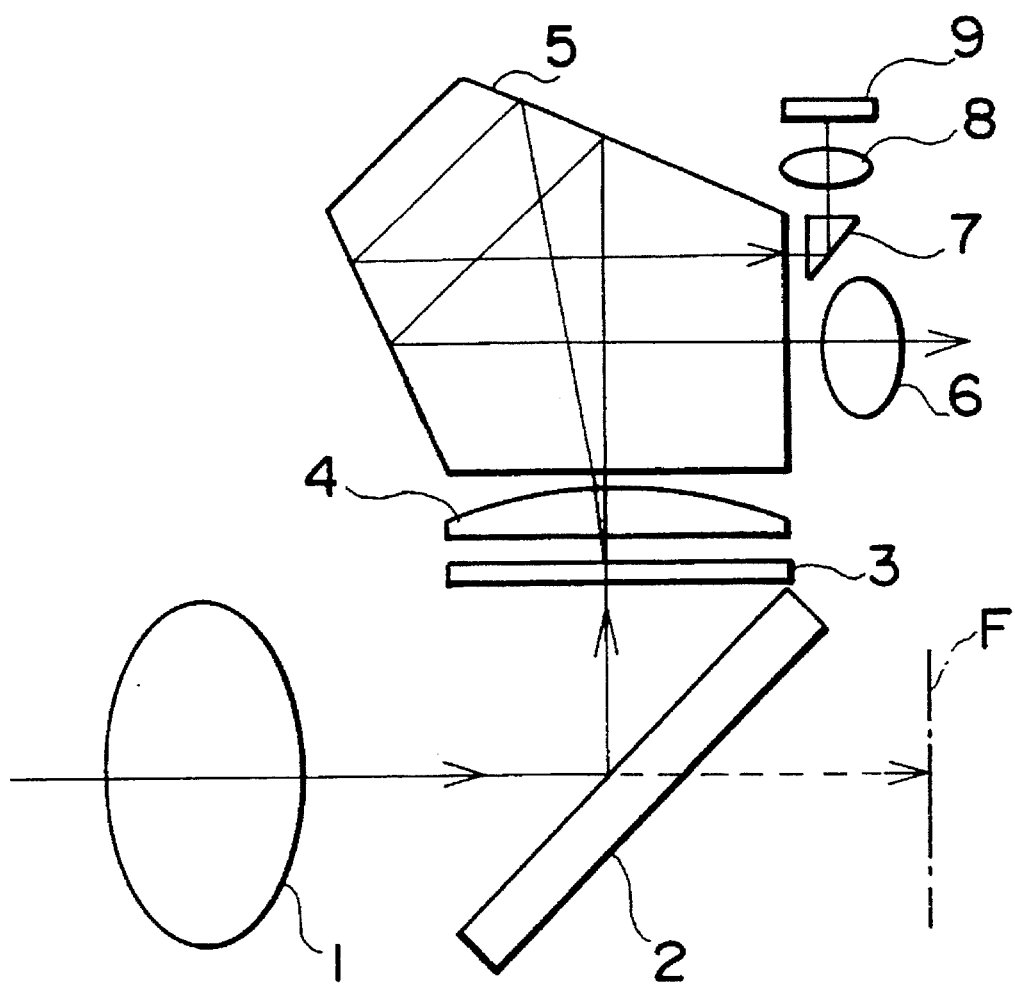
FIG. 1 is a figure showing an optical system of a camera which is a first preferred embodiment of the present invention.
Figure 2:
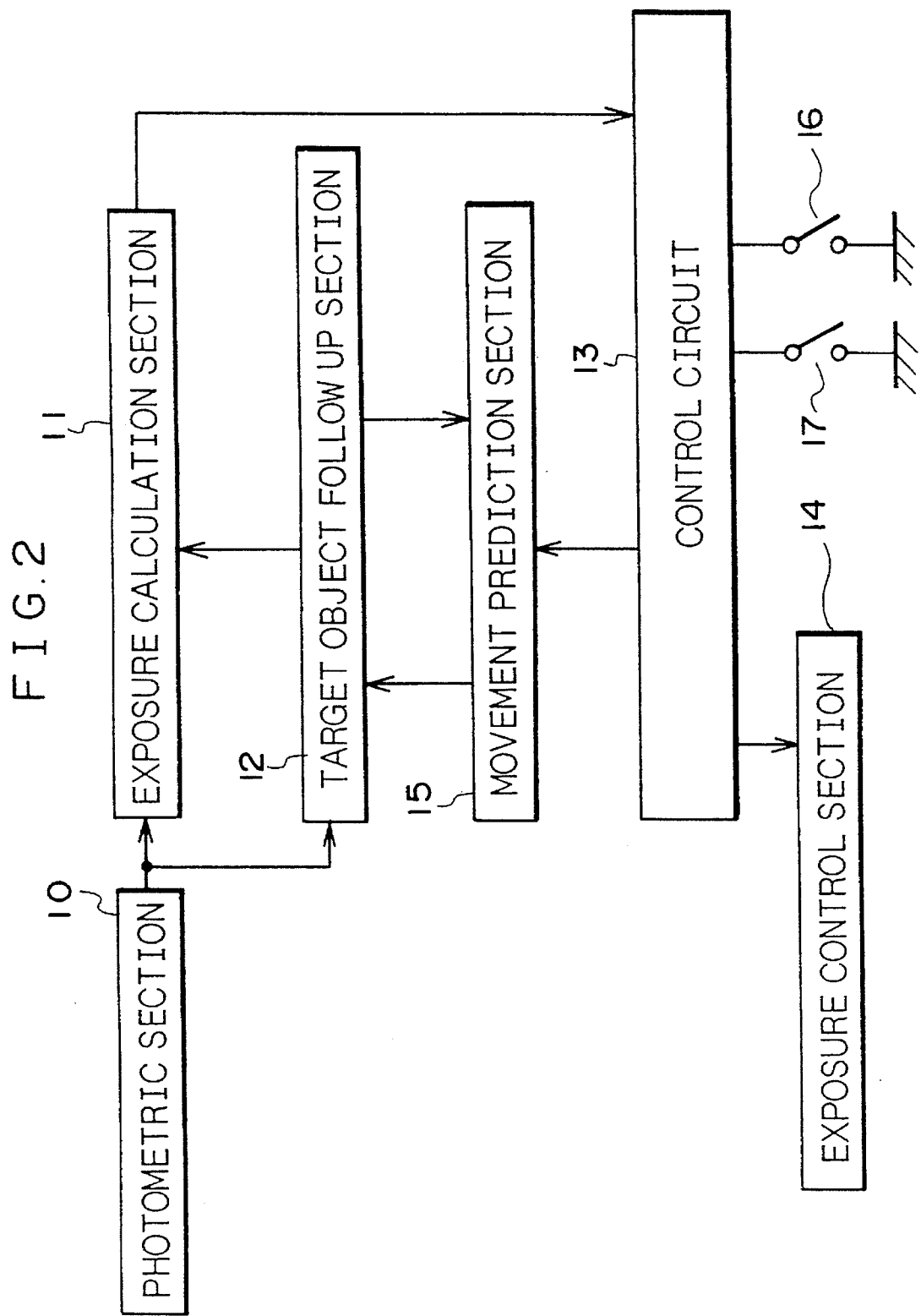
FIG. 2 is a functional block diagram showing the control system of this camera according to the first preferred embodiment.

FIG. 1 is a figure showing the construction of the optical system of a camera which is a first preferred embodiment of the present invention, and FIG. 2 is a functional block diagram showing the construction of the control system of this camera according to the first preferred embodiment.

In the optical system shown in FIG. 1, a light bundle from the object to be photographed passes through a photographic lens 1, is reflected off a quick return mirror 2, and arrives at a focusing screen 3, on which it is focused to produce an image of the object to be photographed. A first portion of a light bundle from this image of the object to be photographed focused upon the focusing screen 3 passes through a condenser lens 4, a pentaprism 5, and a eyepiece lens 6, and arrives at the eyeball of the photographer, and another portion thereof passes through the condenser lens 4 and the pentaprism 5 and through a prism 7 for photometry and through a lens 8 for photometry which focuses an image of the object to be photographed upon a photometric element 9.

Figure 3:
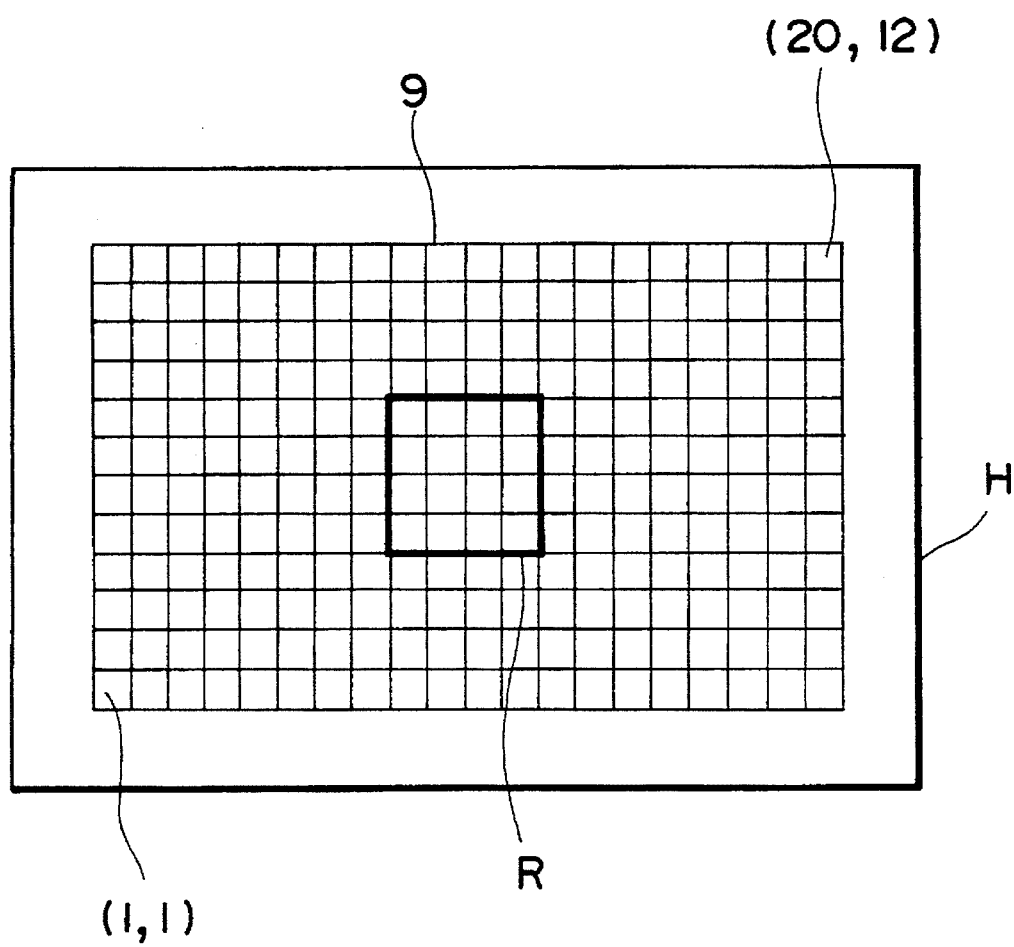
FIG. 3 is a figure showing the arrangement of the photometric regions of a photometric element of this first preferred embodiment.

The photometric element 9, as shown in FIG. 3, is constructed with photometric regions which divide up the photographic field H into 240 sections, 20 horizontally by 12 vertically, and each of these photometric regions detects the brightness of a corresponding portion of the image of the object to be photographed focused thereon. Further, each of these photometric regions is distinguished by an address affixed thereto, from the lower left photometric region which has the address (1,1) to the upper right photometric region which has the address (20,12).

The control system for this camera, as shown in FIG. 2, is provided with a photometric section 10, an exposure calculation section 11, a target object follow up section 12, a control circuit 13, an exposure control section 14, and a movement prediction section 15. The photometric section 10 detects the brightness of the light incident upon each of the regions of the photometric element 9, and outputs corresponding brightness information. The exposure calculation section 11 inputs this brightness information from the photometric section 10 and calculates appropriate exposure value information based upon this brightness information. The target object follow up section 12 inputs the brightness information from the photometric section 10, and performs follow up of the target object to be photographed as it moves in the photographic field based upon this brightness information. The control circuit 13 comprises a CPU and its associated circuitry, and inputs the appropriate exposure value information from the exposure calculation section 11 and performs calculation of aperture opening amount and shutter speed and the like based thereupon, as well as controlling the exposure control section 14 so as to perform exposure control based upon these calculated values of aperture opening amount and shutter speed. The movement prediction section 15 predicts the movement within the photographic field of the object to be photographed while exposure action is taking place, based upon the value of shutter speed which it inputs from the control circuit 13 when the photographer initiates shutter release and upon follow up information for the target object to be photographed which it inputs from the target object follow up section 12, and outputs this movement information after exposure action has been completed to the target object follow up section 12.

A first stroke switch 16 is arranged so as to be closed when a shutter release button not shown in the figures is depressed as far as a first stroke position thereof, and a second stroke switch 17 is arranged so as to be closed when said shutter release button is depressed fully to a second stroke position thereof.

Figure 4A:
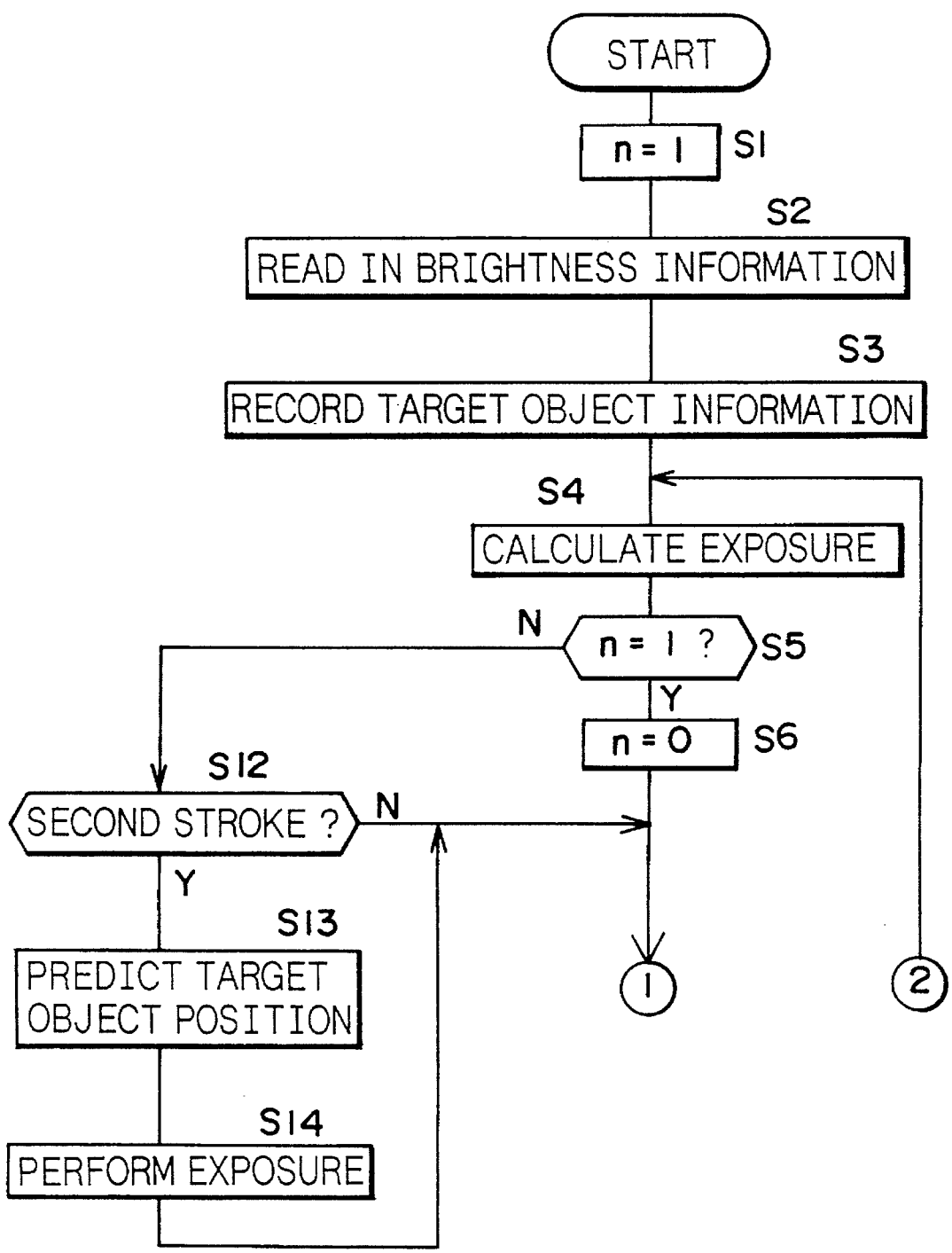
FIGS. 4A and 4B are flow charts showing a control program for target object follow up operation according to this first preferred embodiment.
Figure 4B:
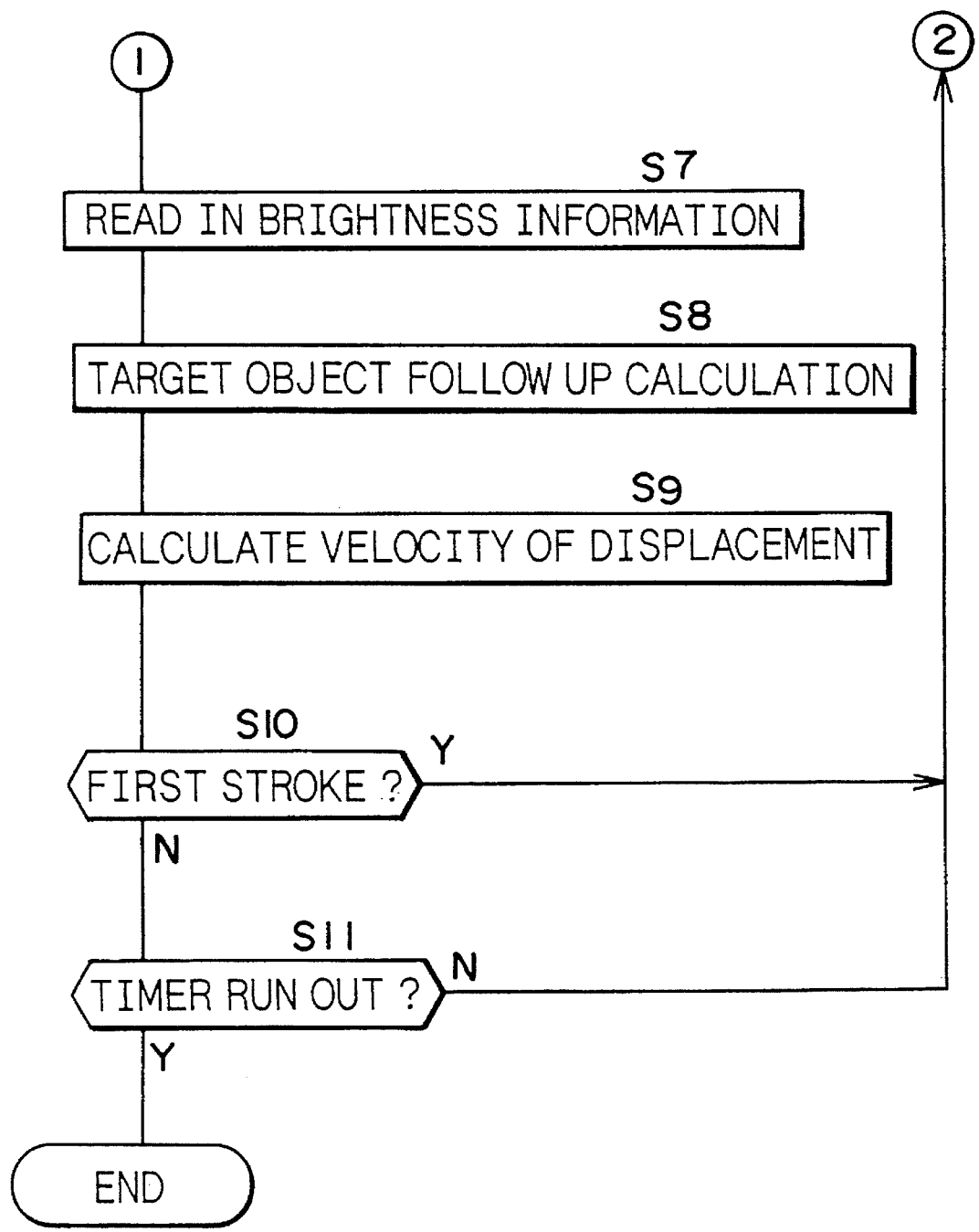

FIG. 4A and FIG. 4B are flow charts showing the operation of a control program for the microcomputer incorporated in the control circuit 13 of this first preferred embodiment. The follow up operation for a target object to be photographed will now be explained with reference to these flow charts.

The control circuit 13 starts to execute this control program when the first stroke switch 16 is closed. First, in the step S1, the value of a register n is initialized to unity. This register n is used as a flag for showing whether or not the program loop including the steps S4 through S14 is being executed for the first time: if the register n is set to unity this shows that the loop is being executed for the first time, while if the register n is set to zero this shows that the loop is being executed for the second or a subsequent time. Next, in the step S2, the photometric section 10 performs photometry of the photographic field H, and brightness information is read in for each of the photometric regions into which said photographic field H is subdivided. And next, in the step S3, information regarding the target object to be photographed is extracted from the brightness information thus obtained for the various photometric regions, and this information is recorded in the target object follow up section 12. Directly after the start of execution of this control program, since the target object to be photographed which is to be followed up is not yet specified, therefore the object to be photographed which lies within a square photometric region R made up, as shown in FIG. 3, of 16 photometric region elements (four horizontally by four vertically) which is located in the central portion of the photographic field H is taken as the object to be photographed which is to be followed up, and the brightness information for the 16 photometric regions included in this square photometric region R is recorded. Accordingly, after the photographer has brought the target object to be photographed which is to be followed up within the region A, the information specifying this target object to be photographed which is to be followed up is recorded by pressing the shutter release button to its first stroke position. Moreover, in the following description, this photometric region R composed of 16 photometric region elements (four horizontally by four vertically) which is set for follow up of a moving target object to be photographed will be termed the target object follow up region.

Next, in the step S4, calculation of an appropriate exposure value BVa is performed by the exposure calculation section 11. This appropriate exposure value BVa is calculated, based upon the average value BVobj of the brightness information of each of the regions within the target object follow up region R made up from 16 photometric regions as described above and upon the average value BVr of the brightness information of each of the other 224 (=240-16) regions, according to the following equation:

$$BVa = (BSvobj - BVr)/2 \tag{1}$$

Next, in the step S5, a decision is made as to whether or not the value of the flag register n is unity, i.e. as to whether or not this program loop is being executed for the first time. If in fact this loop is being executed for the first time, then the flow of control proceeds to the step S6, while if this is a second or subsequent execution of this program loop then the flow of control is transferred to the step S12. In the step S6 the value of the flag register n is reset to zero, and the flow of control proceeds to the step S7, in which photometry of the photographic field H is performed by the photometric section 10, and brightness information is read in for each of the photometric regions.

Follow Up Calculation for the Target Object

Figure 5:
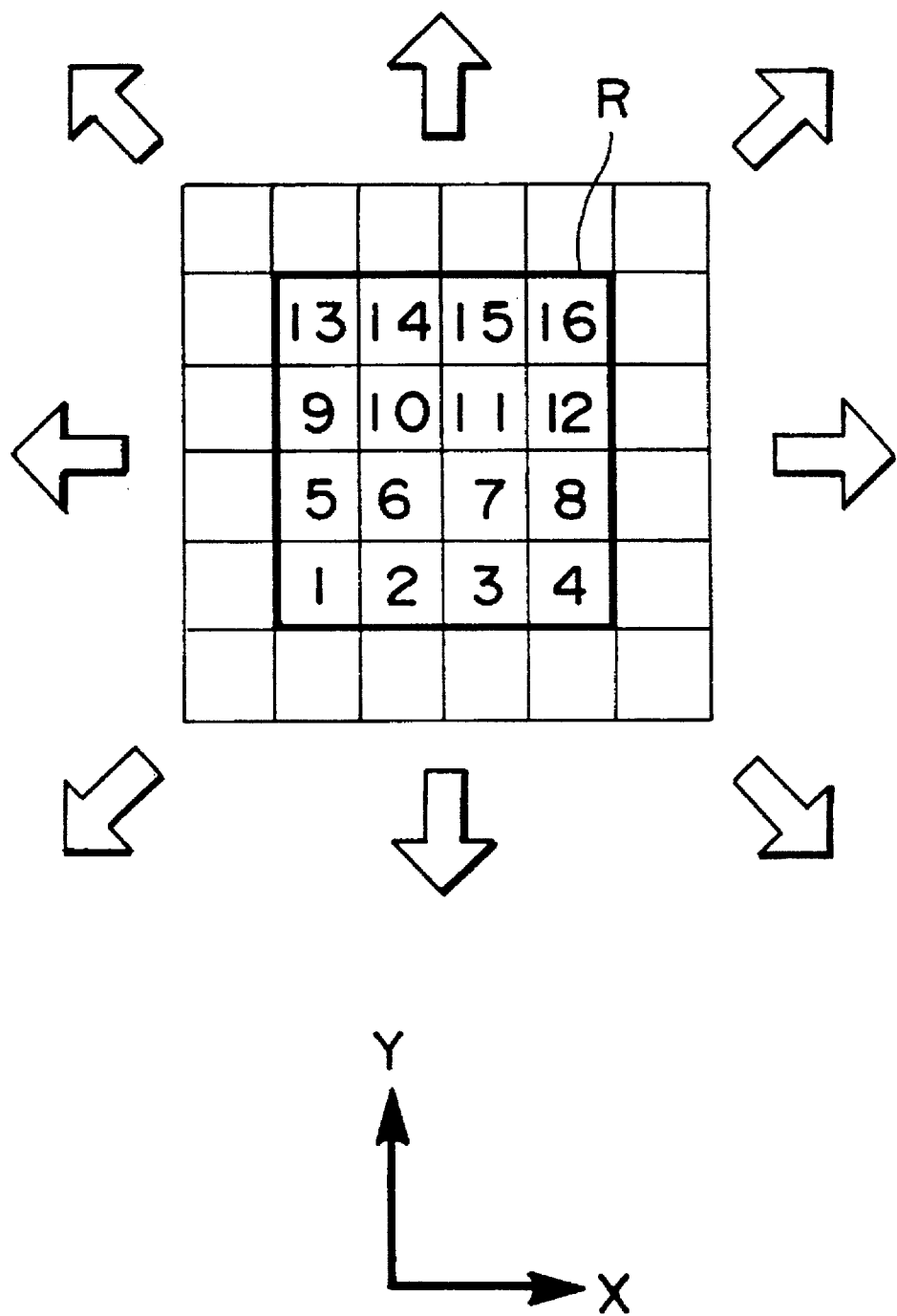
FIG. 5 is a figure for explanation of a target object follow up region defined upon the photometric element, and for explanation of the manner of displacement thereof.

Next, in the step S8, the object to be photographed follow up calculation is performed by the target object follow up section 12. As shown in FIG. 5, if numbers from 1 through 16 are appended to each of the 16 photometric regions (4×4 regions) on the photometric element 9 which constitute the target object follow up region R, then the items of information representing the brightnesses of these 16 regions may be respectively termed B1 through B16. And, setting a total of eight new target object follow up regions by sliding the current target object follow up region R forwards and backwards by one region respectively in the X direction, in the Y direction, and in the two diagonal directions, a total of 9 possible new target object follow up regions including the present target object follow up region R are considered. For each of these 9 possible new target object follow up regions, a comparison value D is calculated by comparing the brightness information Bx (x=1 to 16) for each of the photometric regions within the present target object follow up region R and the brightness information Bx'(x=1 to 16) for each of the photometric regions within the possible new target object follow up region R, according to the following equation:

$$D = \Sigma |BX - BX'| \quad (2)$$

In this equation (2), the symbol sigma denotes summation of the data from x=1 to 16. Further, the information recorded in the step S3 is used as the brightness information Bx when this program loop is being executed for the first time, while when this program loop is being executed for the second and subsequent times the information recorded during the previous execution of this program loop is used. Yet further, the newest brightness information obtained just previously in the preceding step S7 is used as the brightness information Bx'.

In the above described manner, the comparison values D are obtained for the 9 possible new target object follow up regions, and that one thereof for which the comparison value D thus obtained from the equation (2) is the smallest is taken as the follow up region to which the object to be photographed has moved, i.e. as the new target object follow up region R. This will now be explained in detail with reference to FIGS. 6A and 6B.

Figure 6A:
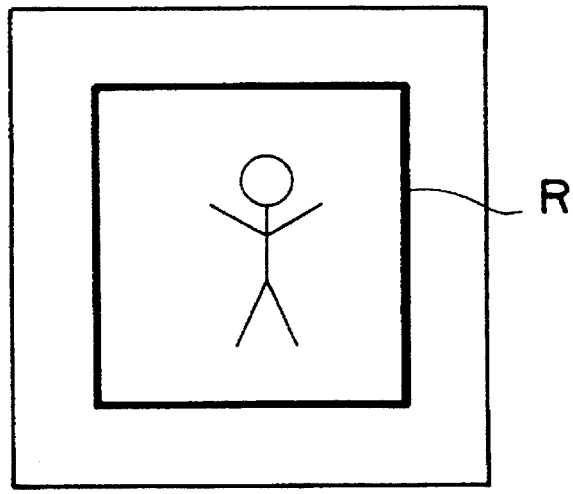
FIGS. 6A and 6B are figures for explanation of the method of follow up for the target object to be photographed.
Figure 6B:
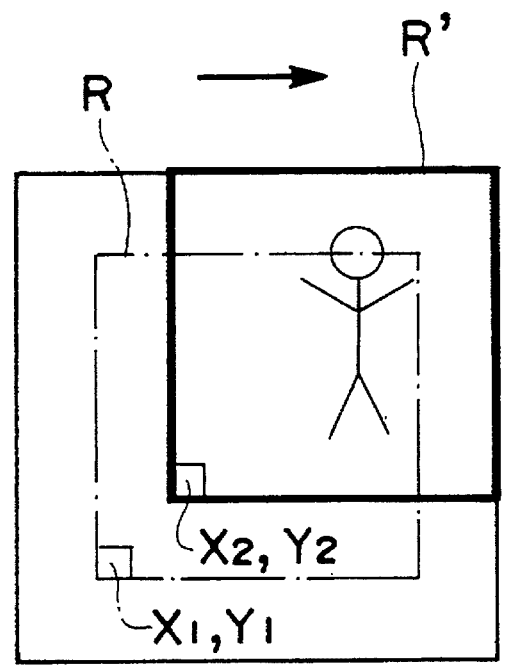

In FIG. 6A there is shown the position of the target object within the target object follow up region R calculated by the target object follow up calculation performed in the step S8 as described above. The brightness information and the positional information for the 16 photometric regions included in the target object follow up region R as shown by the solid line are recorded as the follow up target object information. Now, when this program step S8 is reached again after the program loop has been executed once more, suppose that the object to be photographed has moved to the new position shown in FIG. 6B. At this time, since the region R shown by the dotted line has been recorded as the target object follow up region for the previous time around the program loop, the calculation of equation (2) for follow up of the target object to be photographed is performed 9 times, once for each of the 9 possible new target object follow up regions including the target object follow up region R the same as the previous time around the program loop as shown by the dotted line and the 8 shifted possible new target object follow up regions obtained by displacement by one region of this previous region R shown by the dotted line in each of the vertical direction, the horizontal direction, and the two diagonal directions, in both senses. Since the object to be photographed, which was positioned in the center of the target object follow up region R the time before as shown in FIG. 6A, has now as shown in FIG. 6B shifted in the upwards and rightwards diagonal direction, accordingly the comparison value D calculated according to the equation (2) between the target object follow up region R the time before as shown in FIG. 6B by the dotted line and the region R' shifted in the upwards and rightwards diagonal direction therefrom as shown by the solid line will be the smallest one of these nine comparison values which are calculated. Therefore, because the mutual relationship between these two regions is found to be the strongest, accordingly the object to be photographed follow up region R is shifted from its position as shown by the dotted line to the new position as shown by the solid line, i.e. is displaced in the upwards and rightwards direction, and thereby follow up of the moving target object to be photographed is performed. And the target object follow up section 12 records the positional information and the brightness information for each of the sixteen photometric regions within this new target object follow up region R, and makes them available for the next time this program loop is executed.

Calculation of the Velocity of Movement of the Target Object

Next, in the step S9 of the FIG. 4B flow chart, the velocity of movement of the target object to be photographed is calculated. This calculated velocity of movement will be used in the prediction of the position of the target object to be photographed after the conclusion of the exposure procedure. The velocity of movement is calculated based upon the newest position of the target object to be photographed as obtained in the step S8 during this current execution of the program loop and upon the position of the target object to be photographed as obtained in the step S8 during the previous execution of the program loop. Now, supposing that as shown in FIG. 6B the addresses of the leftmost and lowermost photometric regions in the previous follow up region R and in the new follow up region R' for the target object to be photographed are respectively (x1,y1) and (x2,y2), and supposing that the time period taken from sampling the data shown in FIG. 6A to sampling the data shown in FIG. 6B is t, then the velocities Vx and Vy of the target object to be photographed in the X direction and the Y direction respectively may be respectively calculated from the following equations:

$$Vx = (x2 - x1)/t \quad (3)$$

$$Vy = (y2 - y1)/t \quad (4)$$

Further, upon the second and subsequent times the program loop is executed, the values of Vx and Vy are calculated from the following equations, using the velocities Vx' and Vy' of the object to be photographed in the X direction and the Y direction respectively obtained during the previous time the program loop was executed:

$$Vx = \{(x2 - x1)/t + 7 \times Vx'\}/8 \quad (5)$$

$$Vy = \{(y2 - y1)/t + 7 \times Vy'\}/8 \quad (6)$$

Since the past history of the velocity of movement is taken into account when the velocity of movement is calculated according to the method of equations (5) and (6), it is possible to obtain an accurate velocity of movement, even in circumstances such as when the velocity of movement of the target object to be photographed is subject to variation. Furthermore, although Equations (5) and (6) provide for the data to be refreshed by a factor of ⅛ at a time, this factor may be adjusted according to the period of the calculation cycle, or according to the responsiveness.

Next, in the step S10 of FIG. 4B, a decision is made from the output of the first stroke switch 16 as to whether or not the shutter release button is being pressed through its first stroke, and if the shutter release button is being pressed through its first stroke then the flow of control returns to the previously described step S4, while if the shutter release button is not being pressed through its first stroke then the flow of control passes to the step S11. In this step S11, a decision is made as to whether or not a first stroke timer, which measures time for a set time period from when the shutter release button is pressed through its first stroke, has run out. If the first stroke timer has run out then processing ends, while if the first stroke timer has not run out then the flow of control returns to the previously described step S4.

When the program loop is being executed for the first time, even if the shutter release button is being pressed all the way through its second stroke, forcibly the steps S6 through S11 are executed, and the velocity of movement of the target object to be photographed is calculated. When the program loop is being executed for the second and subsequent times, since the velocity of movement of the target object to be photographed is calculated, prediction calculation for the position of the target object becomes possible, and if the shutter release button is pressed through its second stroke, along with performing prediction of the position of the target object, exposure operation is performed. When the program loop is being executed for the second and subsequent times, in the step S4 the calculation of an appropriate exposure value BVa is performed by the exposure calculation section 11. In the step S5 a decision is made as to whether or not the value of the register n is unity, i.e. as to whether or not the program loop is being executed for the first time. Since the execution of the program loop for the first time has already been completed, the value of the register n is set to zero, and the flow of control passes next to the step S12.

In the step S12, a decision is made according to the output of the second stroke switch 17 as to whether or not the shutter release button is being pressed through its second stroke. If the shutter release button is being pressed through its second stroke, then the flow of control proceeds to the step S13, while if not then the flow of control is transferred to the step S7 and the above described processing is repeated. When the shutter is thus being second stroke released, prediction of the position of the target object to be photographed is performed in the step S13 by the movement prediction section 15.

Prediction of the Position of the Target Object

Figure 7A:
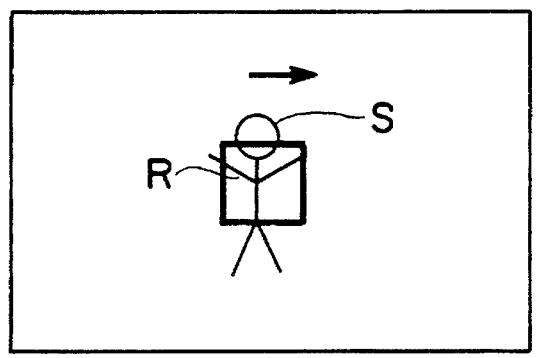
FIGS. 7A through 7C are figures for explanation of the method of prediction of the position of the target object.

The method for prediction of the movement of the position of the target object to be photographed will now be explained with reference to FIGS. 7A through 7C. Suppose that, as shown in FIG. 7A, the target object S to be photographed within the target object follow up region R has been followed up, and that this target object S, as shown by the arrow sign, is moving in the rightwards direction in the figure. And suppose that, after the shutter release has been pressed through its second stroke, during the time period while the action of exposure is being performed, the target object S to be photographed moves as far as the position shown in FIG. 7B, so that, when target object follow up is to be resumed after the conclusion of the exposure action, follow up of the target object S is to be performed from the position which was presumed to be at the center of the target object follow up region R directly before the shutter release. However, since at this time the target object S has already moved as far as a position considerably removed from the target object follow up region R, in the state as shown in FIG. 7B continuation of the follow up action is not possible.

Figure 7B:
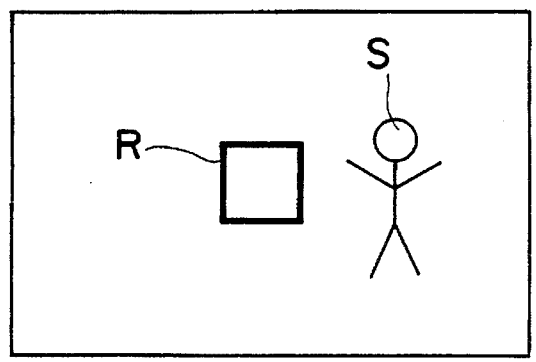
Figure 7C:
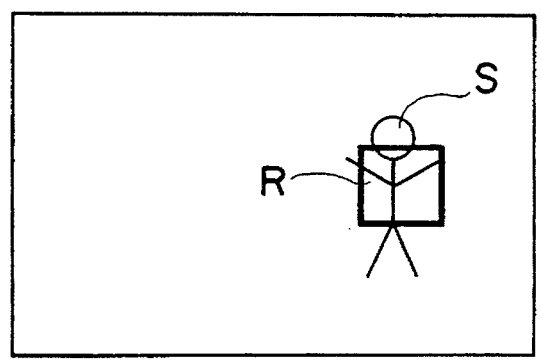

However if at the time point shown in FIG. 7A, just before the shutter release, the direction and speed of movement of the target object S to be photographed and the time interval which will be required for the exposure process are known, then it is possible to predict the position of the target object S at the time point shown in FIG. 7B, when the exposure process has just been completed. In detail, the predicted position (Xn+1, Yn+1) of the target object S just after the exposure process has been completed is obtained from the following equations, based upon the positional information (Xn, Yn) for the position of the target object just before the shutter release obtained in the step S8, the speeds of movement Vx and Vy along the x and y directions of the target object obtained in the step S9, the time period tm required for the quick return mirror 2 to be raised and lowered, and the shutter speed te:

$$Xn+1 = Xn + (tm+te) \times Vx \quad (7)$$

$$Yn+1 = Yn + (tm+te) \times Vy \quad (8)$$

The thus calculated predicted position (Xn+1, Yn+1) of the target object S to be photographed is used as recorded data for refreshment of the positional information for the target object S after the conclusion of the exposure process, and the system continues to follow up the moving target object based upon this positional information. In this manner, even if the target object S to be photographed moves during the exposure process, nevertheless, after the conclusion of the exposure process, as shown in FIG. 7C, the target object follow up region R is shifted along to the predicted position, whereby it is possible to acquire the target object S, so that it becomes possible to continue accurate follow up of the target object S.

In the step S14 of FIG. 4, based upon the appropriate exposure value obtained in the step S4, an limiting aperture mechanism and a shutter mechanism are operated by the exposure control section 14 so as to perform the exposure process, and thereafter the flow of control returns to the step S7 and the above described process is repeated.

Preferred Embodiment 2

Figure 9:
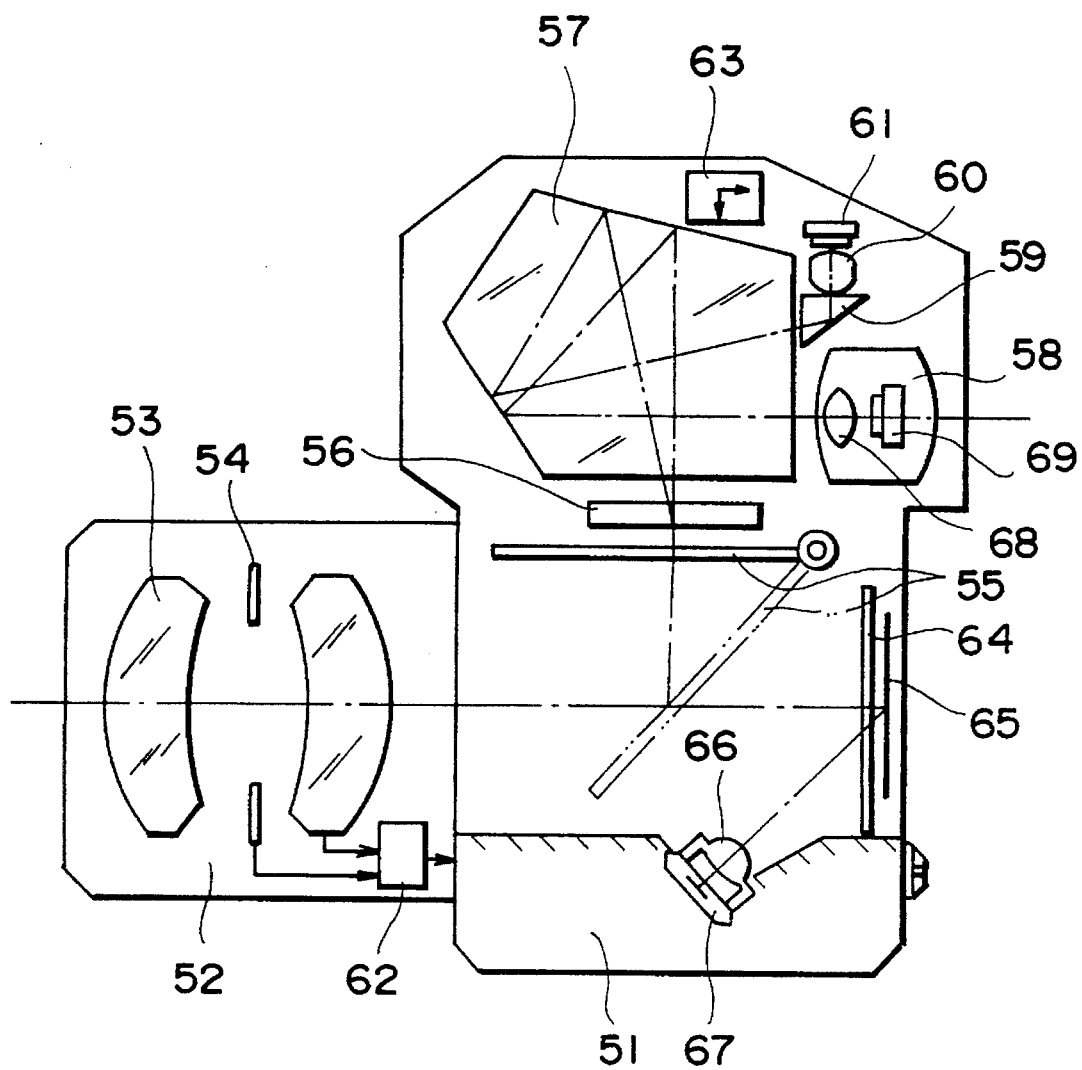
FIG. 9 is a sectional view of a camera according to the second preferred embodiment.

FIG. 9 is a sectional view of the camera according to the second preferred embodiment of the present invention.

A ray bundle from the target object to be photographed passes through a photographic lens 53 and an limiting aperture 54 within a photographic lens unit 52 and is reflected off a main mirror 55 (in its state shown by the dashed lines) included in the camera body 51, and then passes through a screen 56, a pentaprism 57, and an eyepiece lens 58 to reach the eyeball of the photographer. Further, a portion of the ray bundle passes from the pentaprism 57 through a prism 59 and a focusing lens 60 and arrives at a photometric element 61. Yet further, another portion of the ray bundle passes from the pentaprism 57 through a focusing lens 68 and arrives at a photometric element 69.

Various data relating to the photographic lens 53 are recorded within a ROM 62 within the lens, and photographic distance information X is obtained based upon these data and upon the position of the photographic lens 53, and is transmitted to the camera body 51 along with aperture opening value of the limiting aperture 54 and the like. And an attitude detection device 63 detects the attitude of the camera body 51.

A photometric element 67 is an element for measuring the brightness level of flash illumination, which is used when performing flash photography with a flash device not shown in the drawings. Light emitted from the flash device and reflected from the object to be photographed passes through the photographic lens 53 and through the limiting aperture 54 and is reflected from the surface of the film 65, passes through a focusing lens 66, and arrives at the photometric element 67 for flash photometry.

Figure 10:
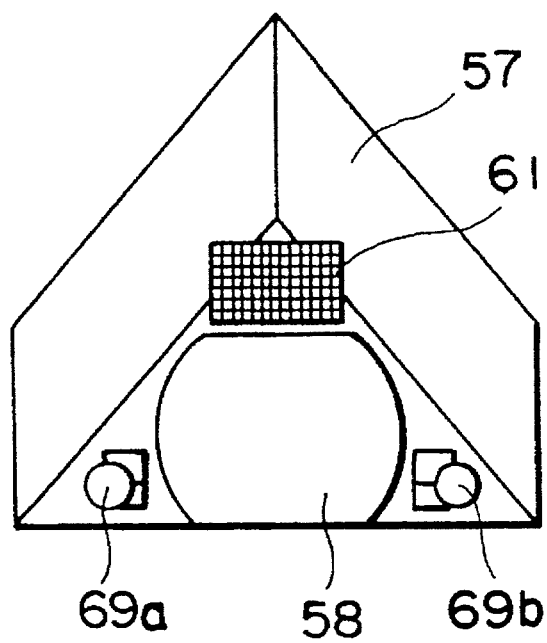
FIG. 10 is a figure showing a first example of the arrangement of photometric elements in this second preferred embodiment.

FIG. 10 shows a first possible example for the disposition of the photometric elements 61, 69a, and 69b. FIG. 10 is a view as seen looking at the pentaprism 57 from the vicinity of the eyepiece lens 58, and, in order conveniently to explain the arrangement of the elements, the orientations of the elements and the like are drawn somewhat differently from those shown in FIG. 9. In contrast to the photometric element 61 which performs photometry using a ray bundle at the upper side of the eyepiece lens 58, the photometric element 69 is split into two portions 69a and 69b which perform photometry using ray bundles on both the left and the right sides of the eyepiece lens 58. In this case, the photometry is performed by splitting up the photographic field into a central portion and four regions surrounding it, so as to give a total of five regions, and for the central portion the pair of left and right elements are superimposed upon the photometric region, and the two photometric values produced thereby are compounded together and taken as the photometric value for the central portion.

Figure 11:
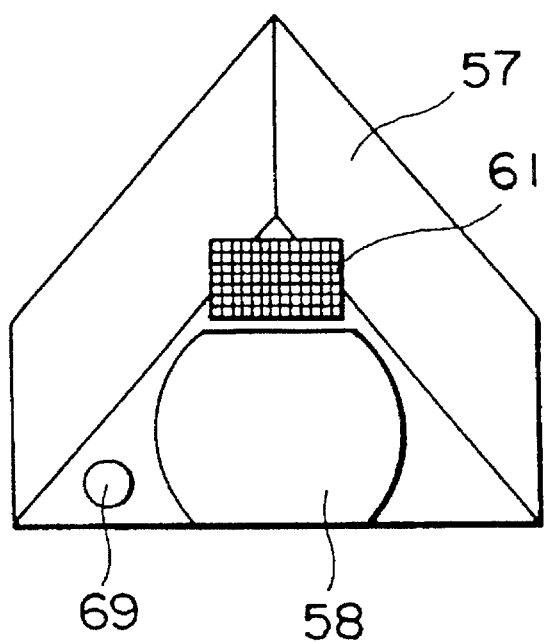
FIG. 11 is a figure showing another example of the arrangement of photometric elements in this second preferred embodiment.

FIG. 11 shows a second possible example for the disposition of the photometric elements 61 and 69. FIG. 11 is a view as seen looking at the pentaprism 57 from the vicinity of the eyepiece lens 58, and, in order conveniently to explain the arrangement of the elements, the orientations of the elements and the like are drawn somewhat differently from those shown in FIG. 9. The figure shows a view as seen from the side of the eyepiece lens 58 looking at the pentaprism 57, and therefore, since the explanation of the arrangement is the primary objective, the orientation of the elements and the like is drawn considerably differently from FIG. 51. In contrast to the photometric element 61 which performs photometry using a ray bundle at the upper side of the eyepiece lens 58, the photometric element 69 performs photometry using a ray bundle at the left side of the eyepiece lens 58. In this case the photometry is performed in a unitary fashion, and the photographic field is not split up into regions.

Figure 12:
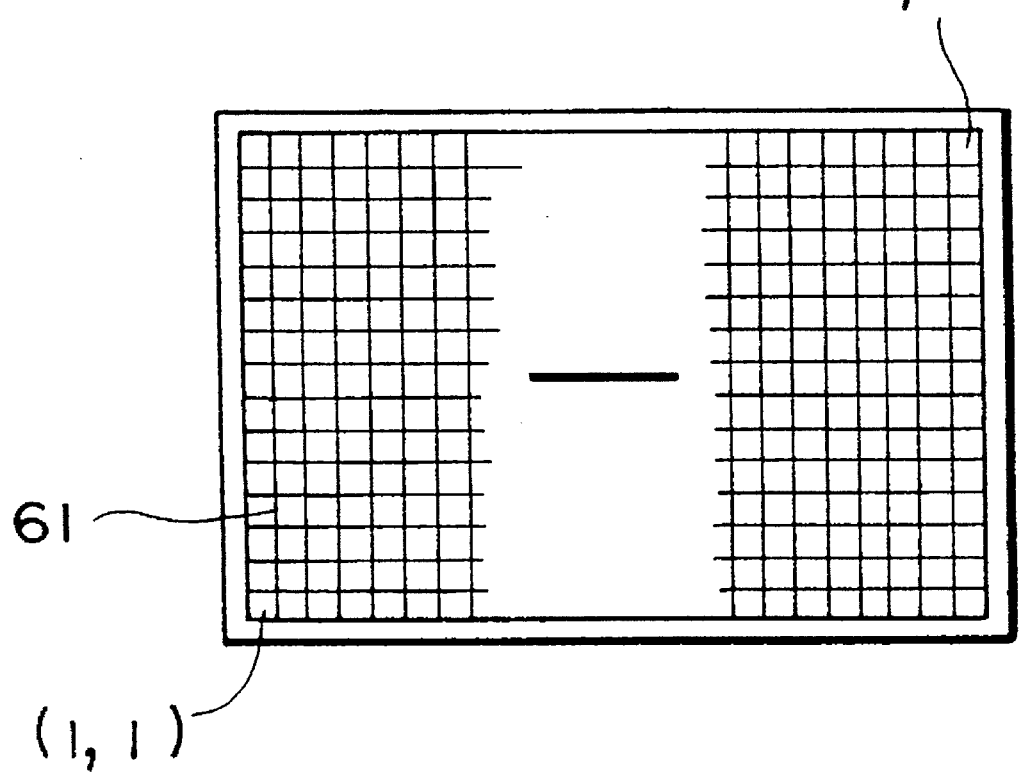
FIG. 12 is a figure showing the photometric regions on the photometric element, in this second preferred embodiment.
Figure 13:
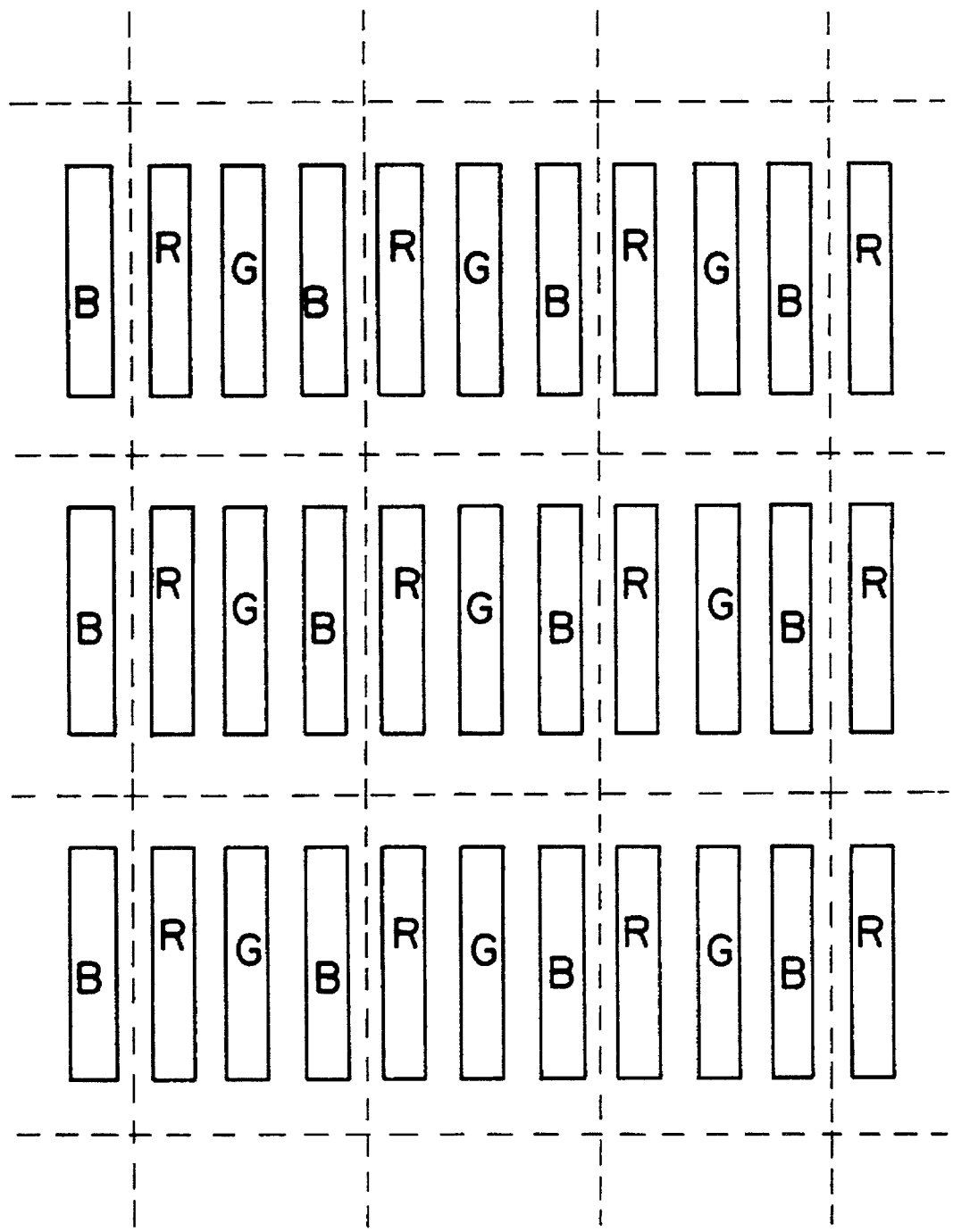
FIG. 13 is a figure showing the arrangement of the color filters positioned on each of the photoelectric regions of the photometric element.

The photometric element 61 is a two dimensional color CCD of the same type as is used in a video camera or the like, and as shown in FIG. 12 performs photometry by, via the focusing lens 60, splitting up the image of the photographic field on the screen 56 into a total of 1035 photometric regions, 69 horizontally by 15 vertically, and can then detect the brightness of each of these individual photometric regions. An address is appended to each of these regions, and, with the camera body 51 being held in the horizontal position, the lower leftmost region is addressed as (1,1) and the upper rightmost region is addressed as (69,15). Further, filters colored in the three primary colors R, G, and B are arranged over the photometric regions of the photometric element 61 in a repeated fashion as shown in FIG. 13, and in this manner the construction is enabled to detect the brightness of each of the photometric regions along with separating the image into the three primary colors. It should be noted that it would also be acceptable for the filters to be colored, not in the primary colors R, G, and B, but in the complementary colors.

Figure 14:
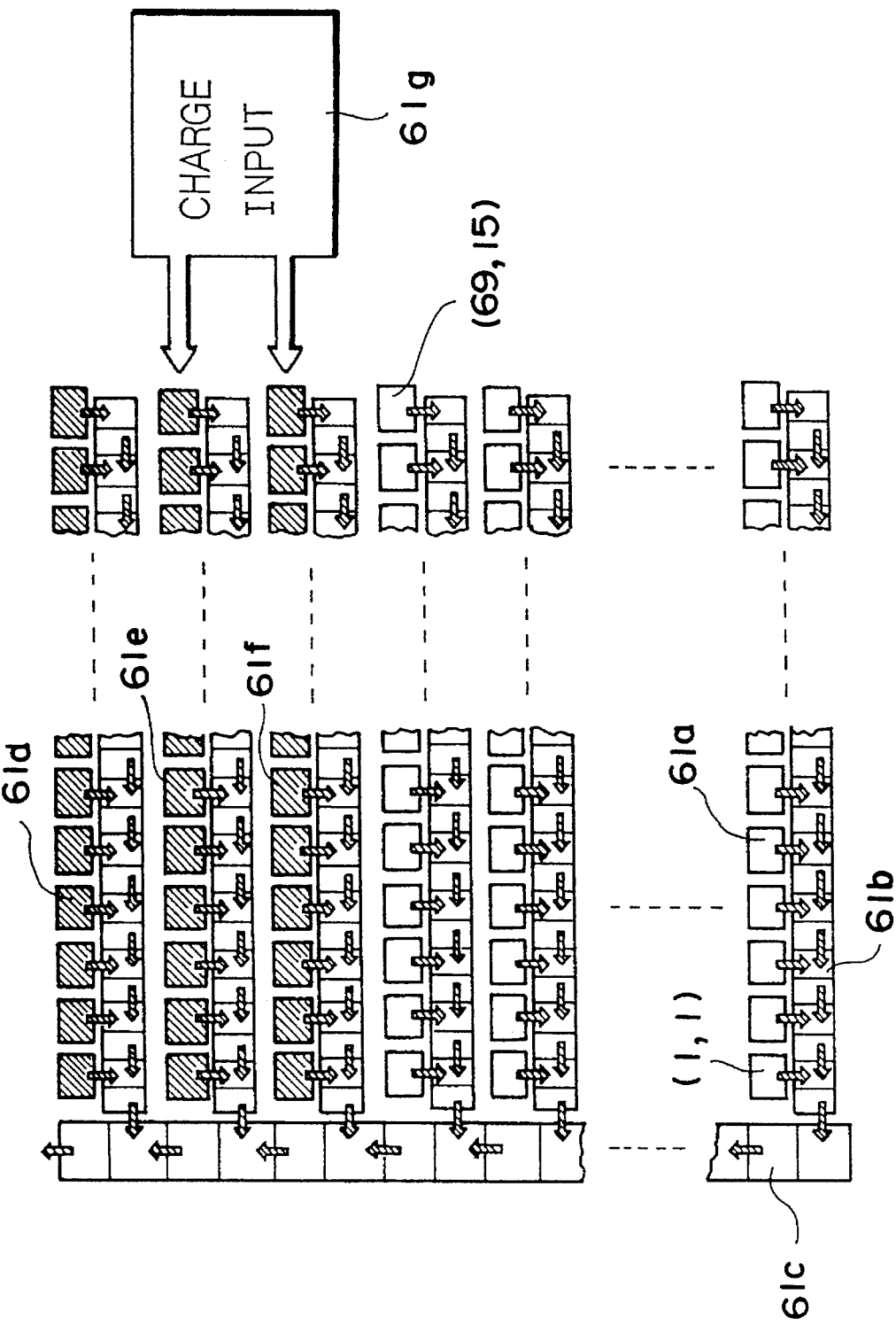
FIG. 14 is a figure showing the internal construction of the photometric element in this second preferred embodiment.

FIG. 14 is a figure showing the internal construction of the photometric element 61. Internal to the photometric element 61, photoelectric conversion elements (photodiodes) 61a are provided, arranged in 69 columns as seen in the horizontal direction and in 15 rows as seen in the vertical direction. A row of shift registers 61b (hereinafter termed the H registers) is provided under each horizontally extending of these photoelectric conversion elements 61a, and the electric charges generated by the photoelectric conversion performed by the photoelectric conversion elements 61a are accumulated for a predetermined time period by a charge accumulation section not shown in the figure, and then are transferred to the H registers 61b all together. At the left ends in the figure of the H registers there are provided V registers 61c, and the electric charges transferred from the H registers 61b are transmitted in the upwards direction in the figure and are converted into voltages by a floating diffusion amplifier not shown in the drawings, and thereafter are output to an amplifier, also not shown.

Optically black portions 61d are provided for interrupting light from the faces of photoelectric conversion elements 61a, and they output dark signals. H registers 61b are also provided under these optically black portions 61d, and, after the electric charges of the dark signals generated by the optically black portions 61d have been accumulated for a predetermined time period by a charge accumulation section not shown in the figure, they are then transferred to the H registers 61b all together, and further are transferred in the upward direction in the direction by the H registers 61b and the V registers 61c, are converted into voltages, and are output to an amplifier, also not shown. By subtracting the value of the dark signals output from the optically black portions 61d from the value of the output signals from the photoelectric conversion elements 61a, dark signal value compensation for the photoelectric conversion elements 61a can be performed.

When light of high brightness exceeding a predetermined amount is incident upon a portion of the photoelectric conversion elements 61a, this causes these ones of the photoelectric conversion elements 61a to overflow, and via the H registers 61b this comes to exert an influence on the outputs of others of the photoelectric conversion elements 61a in the horizontal row of photoelectric conversion elements 61a which includes these photoelectric conversion elements 61a upon which the light of high brightness is incident. Further, if these overflows are numerous, it can also happen that an influence is exerted via the H registers 61b and via the V registers 61c upon the outputs of the photoelectric conversion elements 61a of other rows.

Separate optically black portions 61e and 61f are also provided for interrupting light from the faces of photoelectric conversion elements 61a, just like the optically black portions 61d, and mutually different predetermined amounts of electric charge are input from the charge accumulation section 61g to the 61e row of photoelectric conversion elements 61a and to the 61f row of photoelectric conversion elements 61a respectively. Since outputs are obtained from the rows including these optically black portions 61e and 61f which correspond to the temperatures of their photoelectric conversion elements 61a, thereby, based upon these signals, temperature variations of the photometric outputs of the photometric elements 61 output from the amplifier can be compensated for.

The photometric element 69 is a photodiode which has been used in the prior art for photometry in a camera, and its output is an electric current which corresponds to the strength of the light which is measured. This photometric element 69 is used instead of the photometric element 61 for measuring the brightness of the object to be photographed, when light of high brightness falls upon some of the photoelectric conversion elements 61a of the photometric element 61 and they overflow, and this affects the outputs of the others of the photoelectric conversion elements 61a. In this second preferred embodiment, a photometric element 69 of a type which performs photometry on 5 regions into which the photographic field is divided is used. However, the number of regions into which the photometric element 69 splits the photographic field is not, in this second preferred embodiment, to be considered as being particularly limited.

Figure 15:
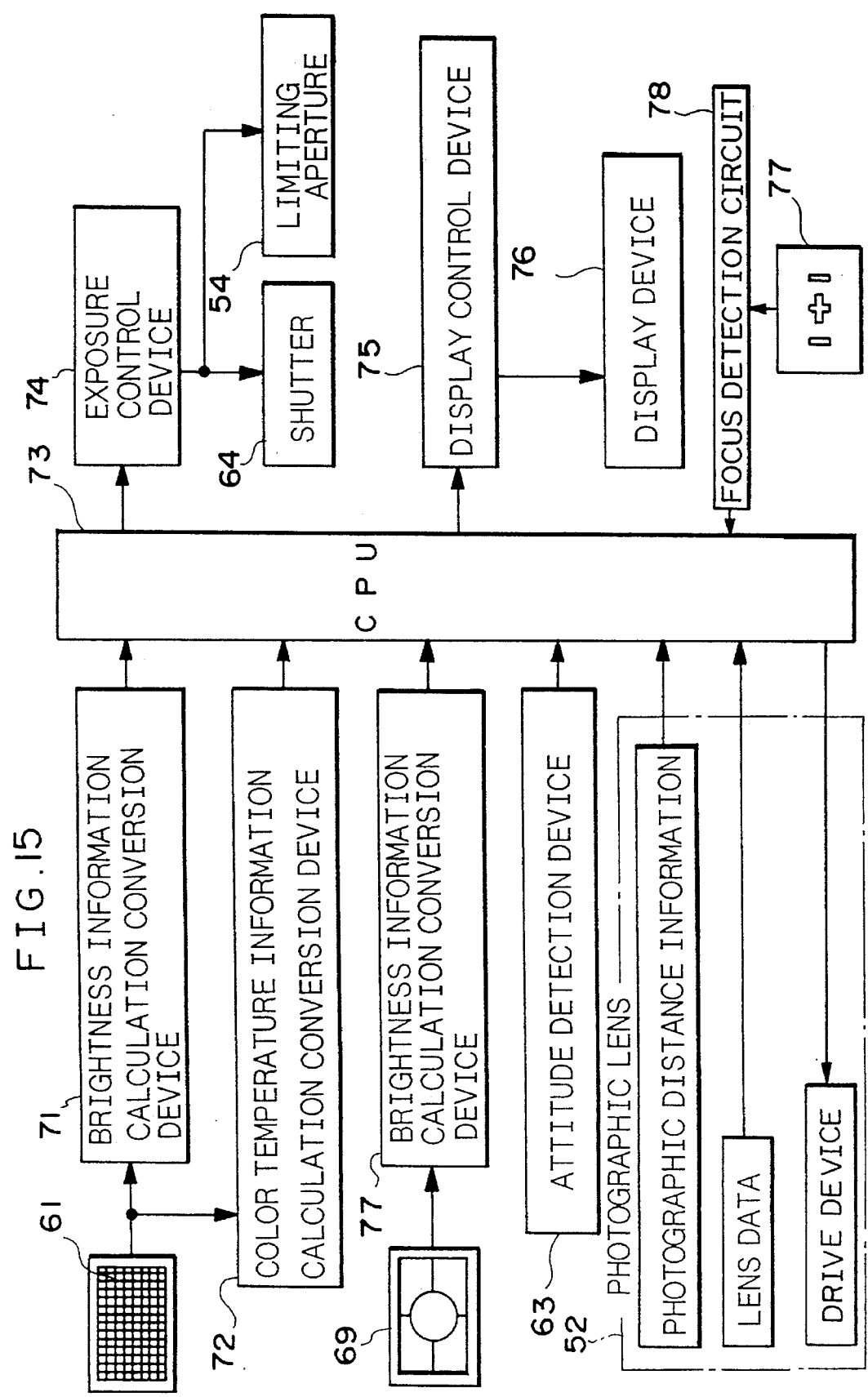
FIG. 15 is a functional block diagram showing the overall construction of this second preferred embodiment.

FIG. 15 is a functional block diagram showing the general construction of the second preferred embodiment of the present invention. The outputs LV(m,n) of the photometric element 61 on the one hand are conversion calculated into brightness values BV(m,n) by a brightness information calculation conversion device 71 and are inputted to a microcomputer 73, and further on the other hand are converted into a color temperature CT by a color temperature information calculation conversion device 72 and are input to the microcomputer 73. The photometric element 61 is a sensor of a charge accumulation type, which accumulates the electric charges output from the photoelectric conversion elements 61a for a predetermined time period and reads out the accumulated charges in order. Since with the charge accumulation type of photoelectric conversion element a comparatively high bias voltage is applied, the problems have arisen that the dark signal is increased and the noise level is elevated, and in low illumination the photometric capability is bad. In particular, the dark signal is increased in high temperature conditions.

The outputs CV(n) (n=1 to 5) of the photometric element 69 are conversion calculated into brightness values BV(n) (n=1 to 5) by a brightness information calculation device 77 and are inputted to the microcomputer 73. The photometric element 69 is a photoelectric conversion element which outputs a current corresponding to the brightness of the light which is incident upon it, and a comparatively low bias voltage is applied to such a photoelectric conversion element. For this reason the dark signal is low, and no problem of the type described above with regard to the photometric element 61 occurs. Furthermore, even in high temperature conditions the dark signal does not become particularly high, and no such problem occurs.

The attitude detection device 63 detects the attitude of the camera body 51 and inputs its result to the microcomputer 73. The attitude of the camera which is sensed can be either of three attitudes: a horizontal or landscape position, a vertical or portrait position in which the pentaprism 57 lies on the right side, and a vertical or portrait position in which the pentaprism 57 lies on the left side.

An image sensor 77 and a focus detection circuit 78 detect the focus adjustment condition of the photographic lens for a left region thereof, for a middle region thereof, and for a right region thereof, and transfer the result of detection to the microcomputer 73. Lens data such as photographic distance information X which is detected based upon the position of the photographic lens 53, information regarding the aperture value of the limiting aperture 54, and the like are transferred from the photographic lens unit 52 to the microcomputer 73 within the camera body 51.

The microcomputer 73 calculates the most appropriate exposure value BVans based upon the information which is input from the various devices described above, and controls a display control device 75 so as to display the result on a display device 76, and further, when the shutter release button of the camera is pressed through its second stroke, controls a exposure control device 74 so as to drive the limiting aperture 54 and the shutter 64 in such a manner as to expose the current film frame according to this calculated most appropriate exposure value BVans.

Figure 16:
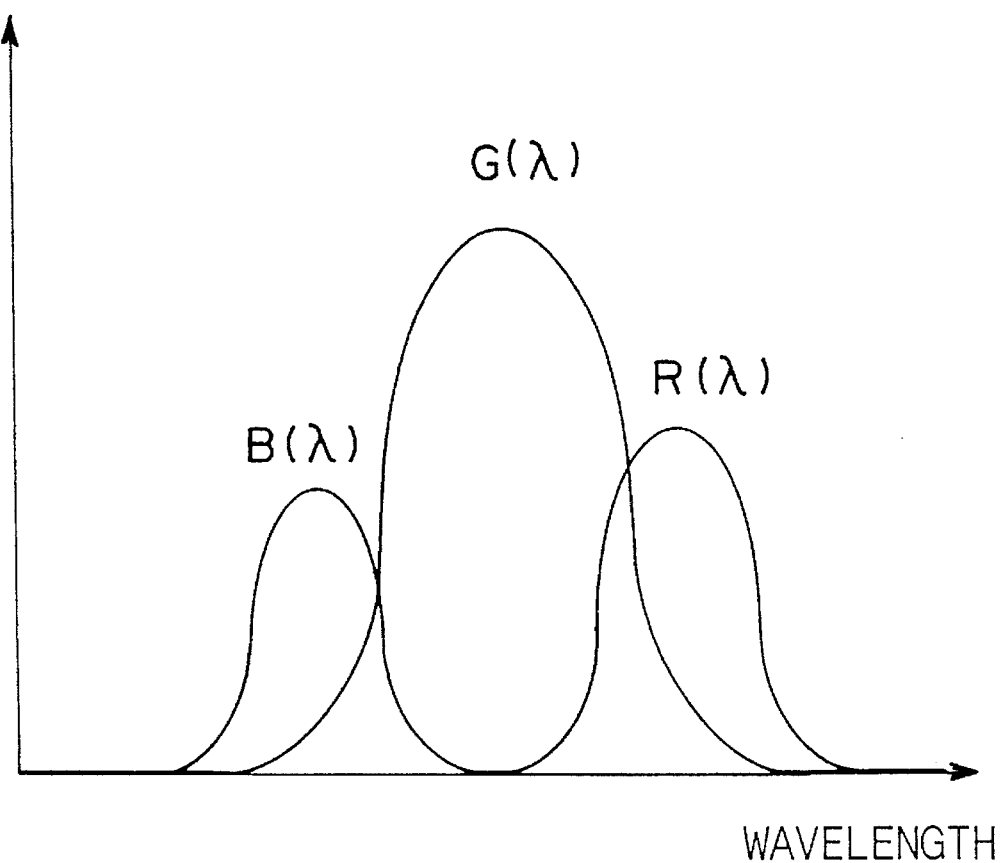
FIG. 16 is a figure showing the three color spectral separation sensitivity characteristic.
Figure 17:
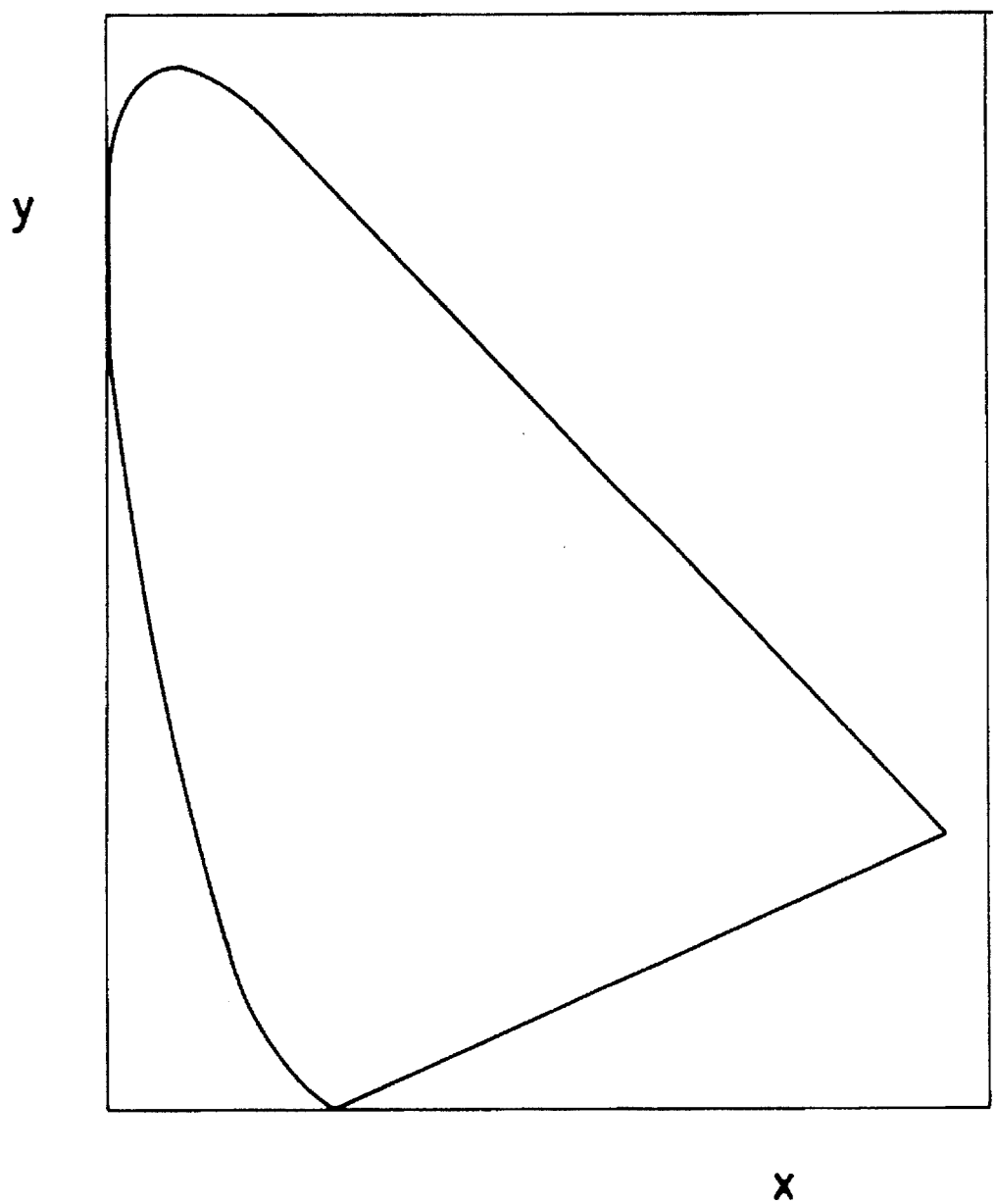
FIG. 17 is an x-y chromaticity diagram.
Figure 18:
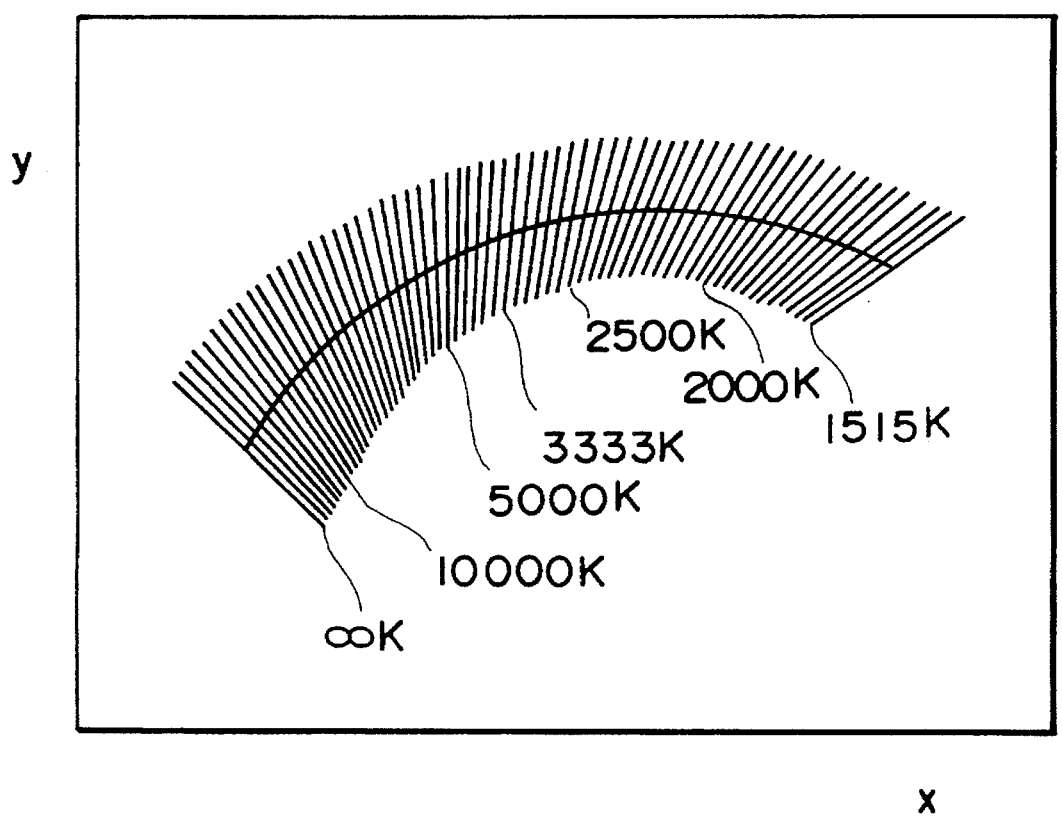
FIG. 18 is a figure showing the Planckian locus and the isocolor-temperature lines.

FIGS. 16 through 18 are for explanation of the operation of the color temperature information calculation conversion device 72. FIG. 16 is a spectral sensitivity characteristic for the three colors of FIG. 13, showing wavelength along the horizontal axis and sensitivity along the vertical axis. The red sensitivity is shown as $R(\lambda)$, the green sensitivity is shown as $G(\lambda)$, and the blue sensitivity is shown as $B(\lambda)$. Taking the outputs from the light receiving section having these sensitivities $R(\lambda)$, $G(\lambda)$, and $B(\lambda)$ as X, Y, and Z, color coordinates x and y are calculated according to the following equations:

$$x=X/(X+Y+Z) \quad (9)$$

$$y=Y/(X+Y+Z) \quad (10)$$

FIG. 17 is an x-y chromaticity diagram. All colors lie within this horseshoe shape or on the edge thereof. From the x-y values obtained from the equations (9) and (10), the color of the corresponding region can be determined.

FIG. 18 is a figure showing the Planckian locus and isocolor-temperature lines. The color temperature is determined from the x-y values obtained from the previous equations by seeing on which isocolor-temperature line they fall. In this second preferred embodiment of the present invention, 345 items of color temperature information are obtained corresponding to a third of 1035, i.e. 345 regions, but the color temperature information calculation conversion device 72 determines the average value thereof, and takes it as the color temperature for the entire photographic field as a whole.

FIG. 19 is a figure showing the gist of the follow up process for a moving target object.

At the time point t0, the photographer captures the object to be photographed which is to be the target for follow up in a follow up frame set in the center of the photographic field, and, when the shutter release button is pressed through its first stroke, the camera discerns the object to be photographed which lies in this follow up frame in the center of the photographic field as being the target object to be photographed, and records the photometric data within the follow up frame as information representative of the principal object to be photographed. At the time point t1, which may for example be 20 ms later, photometry of the target object is performed, and all of the photometric data for the entire photographic field and the thus recorded photometric data for the object to be photographed which is the follow up target are compared. If among the photometric data for the entire photographic field there exists a region of data which almost agrees with the photometric data for the follow up target object to be photographed, then it is decided that the follow up target object to be photographed has moved to within this region, and the follow up frame is moved to the position of this region. At the time point t2 which is, for example, 20 ms after the time point t1, photometry of the photographic field is again performed, and all of the photometric data for the entire photographic field and the photometric data which were obtained the previous time at the time point t1 and the recorded photometric data for the follow up target object to be photographed are compared. If among the newly detected photometric data for the entire photographic field there exists a region of data which almost agrees with the photometric data for the follow up target object to be photographed, then it is decided that the follow up target object to be photographed has moved to within this region, and the follow up frame is moved to the position of this region. And follow up of the target object is again repeated in an identical manner at the time point t3 which is, for example, 20 ms after the time point t2, and so on.

Figure 20B:
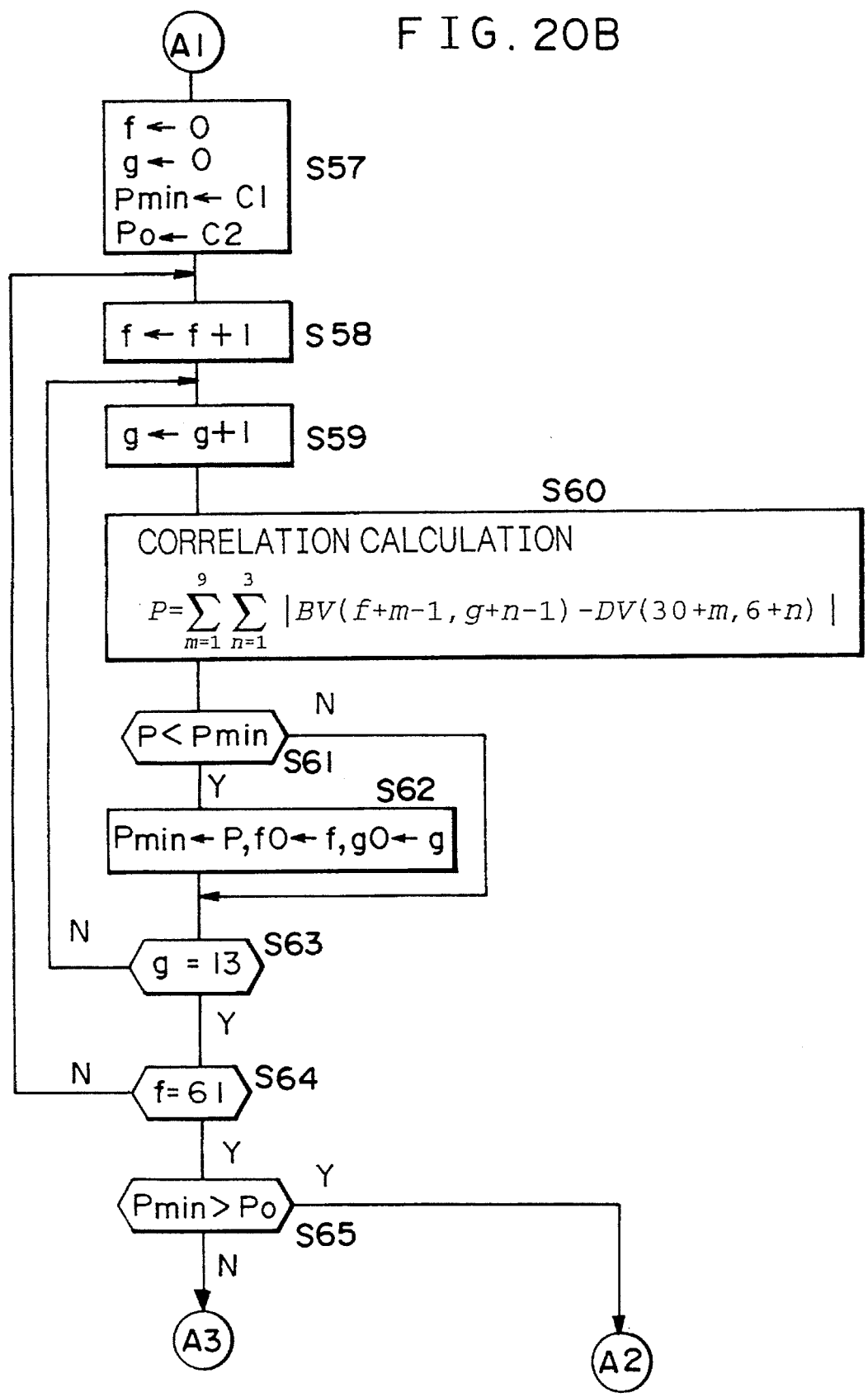

FIGS. 20A through 20C are flow charts for the operation of the microcomputer 73, showing a first variant of the target object follow up operation of this second preferred embodiment of the present invention. The first variant of the operation of target object follow up in this second preferred embodiment will now be explained with reference to these flow charts.

In the step S51, the outputs BV(m,n) from the 27 photometric regions (31,7) to (39,9) which constitute the central portion of the photographic field on the photometric element 9 are read in. Here, m ranges from 31 through 39, and n ranges from 7 through 9. In the step S52, a follow up frame on the display device 76 which surrounds the region corresponding to these 27 central photometric regions (31,7) to (39,9) on the photometric element 9 is displayed as flashing. In the step S53, a decision is made as to whether or the shutter release button of the camera is being depressed by the photographer as far as its first stroke position, and if the shutter release button is being first stroke depressed the flow of control proceeds to the step S54, while if the shutter release button is not being first stroke depressed the flow of control returns to the step S51 and the above described procedure is repeated. In the step S54, the display of the follow up frame in the central portion of the photographic field is turned off as a sign that the image of the object to be photographed at the central portion of the field has been discerned by the photographer as the follow up target object to be photographed. And, in the step S55, the 27 (9×3) brightness values BV(m,n) from the 27 photometric regions (31,7) to (39,9), which were read in the step S51, are recorded as the initial value of the matrix of brightness information DV(m,n) (m=31 to 39, n=7 to 9) for the follow up target object to be photographed. Then, in the step S56, all of the 1035 brightness values BV(m,n) (m=1 to 69, n=1 to 15) representing the entire photographic field from (1,1) to (69,15) are read in as a 69×15 matrix of brightness information.

In the step S57, the count variables f and g, which are for counting around the inner loops of this section of the program, are set to their initial values of zero, and the value Pmin which shows the correlation and the parameter Po are respectively set to predetermined values C1 and C2. In the step S58 the count variable f is incremented, and in the step S59 the count variable g is incremented. In the step S60, comparison is performed between the current pattern recorded as the 9×3 matrix of brightness information DV(m, n) (m=31 to 39, n=7 to 9) for the follow up target object to be photographed of the photometric regions at the central area (31,7) to (39,9) of the photographic field and the brightness pattern of a 9×3 matrix of 27 photometric regions in the photographic field with its lower left corner at (f,g), f and g being the count variables which are being cycled through their ranges so as to shift this 9×3 matrix all over the photographic field; i.e., correlation calculation is performed between these two patterns according to the equation:

$$P=\Sigma\Sigma|BV(f+m-1,g+n-1)-DV(30+m,6+n)| \quad (11)$$

In this equation (11), the summation for m is performed from 1 to 9, and the summation for n is performed from 1 to 3. The smaller is the value of P, the result of this correlation calculation, the higher is the correlation.

In the step S61, a decision is made as to whether or not the value of P is less than the current value of Pmin, and if P is smaller than Pmin the flow of control passes to the step S62, while if P is not smaller than Pmin then the flow of control skips past the step S62 to the step S63. In the step S62, Pmin is reset to the current value of P, and the current values of f and g are stored respectively in the memory f0 and g0. In the step S63, a decision is made as to whether or not the value of g is equal to 13, and if g is equal to 13 then the flow of control proceeds to the next step S64, while if g is not yet equal to 13 then the flow of control loops back to the step S59 again. And, in the step S64, a decision is made as to whether or not the value of f is equal to 61, and if f is equal to 61 then the flow of control proceeds to the next step S65, while if f is not yet equal to 61 then the flow of control loops back to the step S58 again.

In the step S65, a decision is made as to whether or not Pmin is greater than the value P0, and if Pmin is greater than the predetermined P0 then follow up of the target object to be photographed is deemed to be impossible (the target has been lost) and the flow of control returns back to the step S51, and the system goes into waiting state until again the shutter release button of the camera is depressed as far as its first stroke position by the photographer, at which time the image of the object to be photographed which is currently at the central portion of the photographic field is discerned as the follow up target object to be photographed. At this time, the display of the follow up frame at the central portion of the photographic field is flashed, and the driving of the lens for focus adjustment is prevented. On the other hand, if in the step S65 it is deemed that Pmin is not greater than the predetermined value P0, then the flow of control is transferred to the step S66 of the FIG. 20C flow chart, and the new position of the principal object to be photographed is taken as being the position of the 27 photometric regions which gives the value Pmin. That is to say, it is deemed that the principal object to be photographed which is the subject of follow up as recorded in the step S55 has moved within the photographic field, and to have moved to the position which determined from the values of f and g stored in the memory f0 and g0. In the step S67, the 27 photometric elements constituting the field which in the step S66 was decided to be the position of the principal object to be photographed are displayed by a flashing follow up frame surrounding them. In the step S68, an exposure value is calculated based upon the brightness values Bv of these 27 photometric elements constituting the field which in the step S66 was decided to be the position of the principal object to be photographed. In the step S69, the focus of the photographic lens 53 is adjusted for the position decided in the step S66 to be the position of the principal object to be photographed. And, in the step S70, a decision is made as to whether or not the shutter release button of the camera is being pressed through its second stroke by the photographer, and if the shutter release button is in fact being second stroke pressed for performing shutter release then the flow of control passes to the next step S71 and photography is performed and then this control program terminates, while if the shutter release button is not being second stroke pressed then the flow of control returns back to the step S56 of FIG. 20A and the above described process is repeated.

Figure 21B:
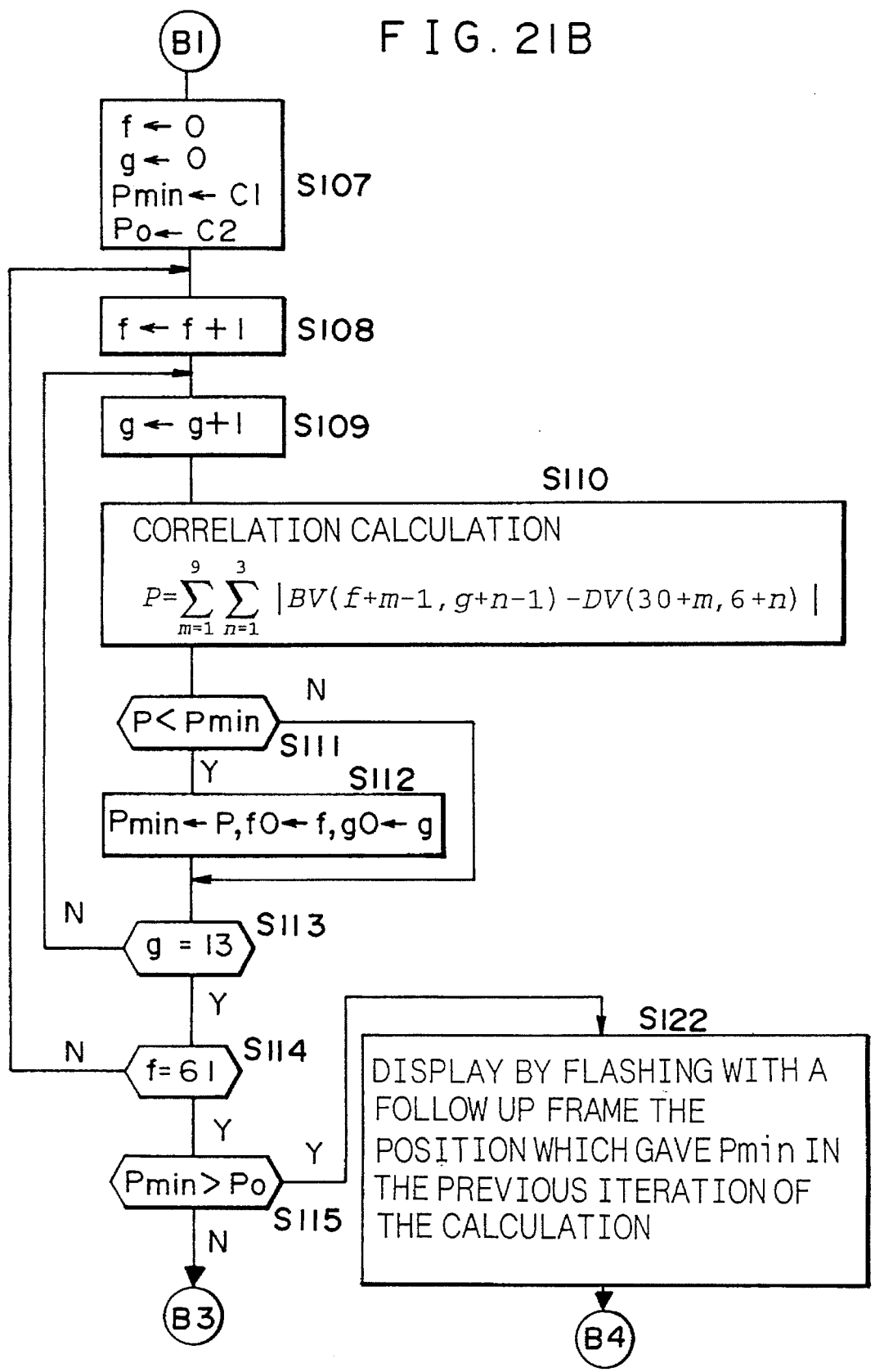

FIGS. 21A through 21C are flow charts for the operation of the microcomputer 73, showing a second variant of the target object follow up operation of the second preferred embodiment of the present invention.

The operations performed by the steps S101 through S121, in this second variant, are identical to those performed by the steps S51 through S71 in the first variant described above, with however different numbering of the steps, and accordingly in the interests of brevity explanation thereof will be curtailed. With the first variant of the process of follow up of the target object to be photographed described above with reference to FIGS. 20A through 20C, when in the step S65 the value of Pmin was found not to be less than or equal to the predetermined value P0, target follow up was considered to be impossible, and the flow of control returned to the step S51, and the system went into the waiting state until the time point when again the photographer pressed the shutter release button as far as its first stroke, at which time the image of the object at the center of the photographic field was discerned as the follow up target. However, in this second variant of the follow up process, in the step S115 the decision is made as to whether or not the value of Pmin is greater than the predetermined value P0, and when the value of Pmin is found not to be less than or equal to the predetermined value P0, then target follow up is considered to be impossible, and the flow of control is transferred to the step S122, in which the position of the object to be photographed which gave the value Pmin during the correlation calculation for the previous iteration of the program loop is shown by a flashing follow up box around it, and the driving of the lens for focus adjustment is prevented and the flow of control returns to the step S106. Further, the brightness pattern of the object to be photographed which was discerned in the beginning in the center of the photographic field and the brightness patterns of each of the possible sets of 27 (9×3) photometric regions in the photographic field are compared and correlation calculation is performed again. In other words, with the first variant of the process of follow up of the target object to be photographed described above with reference to FIGS. 20A through 20C, when target follow up was considered to be impossible, the process was performed again by discerning the object to be photographed at the center of the photographic field as the target object to be followed up. However by contrast, with this second variant, even when target follow up is considered to be impossible, the follow up process for the object to be photographed which was discerned in the beginning as being the subject of follow up is continued, and the correlation calculation is performed again with the present position of the object to be photographed being taken as being the position of the object to be photographed obtained by the correlation calculation for the previous iteration of the program loop. That is, if follow up of the object to be photographed has become impossible, the system waits until follow up is again possible at the position at which follow up became impossible.

The present invention has been shown and described in terms of several preferred embodiments thereof, but is not to be considered as limited by any of the perhaps quite fortuitous details of said embodiments or of the drawings, but only by the terms of the appended claims, which follow.

We claim:

1. A camera having a target follow up function, comprising:

a photometric means, which performs photometry on a plurality of regions into which the photographic field is divided, and which outputs information representing the brightness of each of said regions;

a follow up means, which detects the movement of an object to be photographed based upon the brightness information output by said photometric means, and which follows up said object to be photographed;

and a prediction means which, during the time period while said photometric means cannot perform photometry, predicts the movement of said object to be photographed based upon the movement information for said object to be photographed detected by said follow up means, and which obtains the position of said object to be photographed for when photometry by said photometric means recommences.

2. A camera having a target follow up function according to claim 1, wherein said follow up means in its initial state discerns as a follow up target object an object to be photographed which is in a predetermined region of the photographic field.

3. A camera having a target follow up function according to claim 2, wherein said predetermined region of the photographic field is a region which includes the central portion of the photographic field.

4. A camera having a target follow up function according to claim 2, further comprising a display means which displays said predetermined region of the photographic field in its initial state.

5. A camera having a target follow up function according to claim 1, wherein said prediction means calculates the velocity of movement of said object to be photographed based upon the movement information for said object to be photographed detected by said follow up means, and predicts the movement of said object to be photographed based upon this velocity of movement and upon the time period during which said photometric means cannot perform photometry.

6. A camera having a target follow up function according to claim 5, wherein said prediction means calculates the newest velocity of movement of said object to be photographed using information regarding its velocity of movement in the past.

7. A camera having a target follow up function according to claim 1, wherein said prediction means predicts the movement of said object to be photographed during the time period while said photometric means cannot perform photometry due to a quick return mirror being raised.

8. A camera having a target follow up function according to claim 1, further comprising an exposure calculation means which calculates an appropriate exposure value based upon the movement information for said object to be photographed detected by said follow up means, and upon the brightness information for said regions detected by said photometric means.

9. A camera having a target follow up function according to claim 1, wherein said photometric means comprises a plurality of photoelectric conversion elements arranged in a two dimensional array.

10. A camera having a target follow up function according to claim 2, wherein, when follow up of said object to be photographed by said follow up means has become impossible, said follow up means returns to its said initial state in order to discern an object to be photographed as a follow up target.

11. A camera having a target follow up function according to claim 1, wherein, when follow up by said follow up means of said object to be photographed has become impossible, said follow up means stands by at the position at which follow up has become impossible until follow up becomes possible again.

12. A camera having a target follow up function according to claim 11, further comprising a display means which, when follow up by said follow up means of said object to be photographed has become impossible, displays by flashing the position at which follow up has become impossible.

13. A camera having a target follow up function according to claim 1, wherein, when follow up of said object to be photographed by said follow up means has become impossible, said follow up means prevents the driving of a lens for focus adjustment.

14. A camera having a target follow up function, comprising:

a photometric means, which performs photometry on a plurality of regions into which the photographic field is divided, and which outputs information representing the brightness of each of said regions;

a follow up means, which in its initial state discerns as a follow up target an object to be photographed which is in a predetermined region of the photographic field, and which detects the movement of said object to be photographed based upon the brightness information output by said photometric means, and follows up said object to be photographed;

and a resumption means, which, when follow up of said object to be photographed by said follow up means has become impossible, returns said follow up means to its said initial state.

15. A camera having a target follow up function according to claim 14, wherein said predetermined region of the photographic field is a region which includes the central portion of the photographic field.

16. A camera having a target follow up function according to claim 14, further comprising a display means which displays said predetermined region of the photographic field in its initial state.

17. A camera having a target follow up function according to claim 14, further comprising a display means which, when follow up by said follow up means of said object to be photographed has become impossible, displays by flashing said predetermined region of the photographic field.

18. A camera having a target follow up function according to claim 14, further comprising a prevention means which, when follow up by said follow up means of said object to be photographed has become impossible, prevents the driving of a lens for focus adjustment.

19. A camera having a target follow up function according to claim 14, wherein said photometric means comprises a plurality of photoelectric conversion elements arranged in a two dimensional array.

20. A camera having a target follow up function according to claim 14, further comprising an exposure calculation means which calculates an appropriate exposure value based upon the movement information for said object to be photographed detected by said follow up means, and upon the brightness information for said regions detected by said photometric means.

21. A camera having a target follow up function, comprising:

a photometric means, which performs photometry on a plurality of regions into which the photographic field is divided, and which outputs information representing the brightness of each of said regions;

a follow up means, which in its initial state discerns as a follow up target an object to be photographed which is in a predetermined region of the photographic field, and which detects the movement of said object to be photographed based upon the brightness information output by said photometric means, and follows up said object to be photographed;

and a standby means, which, when follow up of said object to be photographed by said follow up means has become impossible, stands said follow up means by at the position at which follow up has become impossible until follow up becomes possible again.

22. A camera having a target follow up function according to claim 21, wherein said predetermined region of the photographic field is a region which includes the central portion of the photographic field.

23. A camera having a target follow up function according to claim 21, further comprising a display means which displays said predetermined region of the photographic field in its said initial state.

24. A camera having a target follow up function according to claim 21, further comprising a display means which, when follow up by said follow up means of said object to be photographed has become impossible, displays by flashing the position at which follow up has become impossible.

25. A camera having a target follow up function according to claim 21, further comprising a prevention means which, when follow up by said follow up means of said object to be photographed has become impossible, prevents the driving of a lens for focus adjustment.

26. A camera having a target follow up function according to claim 21, wherein said photometric means comprises a plurality of photoelectric conversion elements arranged in a two dimensional array.

27. A camera having a target follow up function according to claim 21, further comprising an exposure calculation means which calculates an appropriate exposure value based upon the movement information for said object to be photographed detected by said follow up means, and upon the brightness information for said regions detected by said photometric means.

28. A target follow up device, comprising:

a photometric section which performs photometry on a plurality of photometric regions into which a photometry field is divided, and which outputs brightness information from said photometric regions;

a follow up target recognizing section which recognizes as a follow up target an object in a predetermined follow up region within said photometric regions; and a follow up target detecting section that continues detecting a position of said follow up target in said photometric regions based on brightness information of said follow up target that has been recognized by said follow up target recognizing section, and which predicts a next position of said follow up target when no follow up target can be detected by said follow up target detecting section.

29. The target follow up device of claim 28, wherein said photometric regions of said photometric section correspond to a photographic field of said camera.

30. A target follow up device, comprising:

a photometric section which performs photometry on a plurality of photometric regions into which a photometry field is divided, and which outputs brightness information from said photometric regions;

a follow up target recognizing section which recognizes as a follow up target an object in a predetermined follow up region within said photometric regions; and a follow up target detecting section that continues detecting a position of said follow up target in said photometric regions based on brightness information of said follow up target that has been recognized by said follow up target recognizing section, wherein said follow up target recognizing section recognizes a new follow up target when no follow up target can be detected by said follow up target detecting section.

31. The target follow up device of claim 30, wherein said photometric regions of said photometric section correspond to a photographic field of said camera.

32. A target follow up device, comprising:

a photometric section which performs photometry on a plurality of photometric regions into which a photometry field is divided, and which outputs brightness information from said photometric regions;

a follow up target recognizing section which recognizes as a follow up target an object in a predetermined follow up region within said photometric regions; and a follow up target detecting section that continues detecting a position of said follow up target in said photometric regions based on brightness information of said follow up target that has been recognized by said follow up target recognizing section, and that stands by at a position where detecting of said follow up target became impossible in said follow up target detecting section until said detecting of said follow up target becomes possible.

33. The target follow up device of claim 32, wherein said photometric regions of said photometric section correspond to a photographic field of said camera.

34. A target follow up device, comprising:

a photometric section which performs photomerry on a plurality of photometric regions into which a photometry field is divided, and which outputs brightness information from said photometric regions;

a follow up target recognizing section which recognizes as a follow up target an object in a predetermined follow up region within said photometric regions; and a follow up target detecting section that continues detecting a position of said follow up target in said photometric regions based on brightness information of said follow up target that has been recognized by said follow up target recognizing section, and that stands by at a position where detecting of said follow up target became impossible in said follow up target detecting section.

35. A camera having a target follow up function, comprising:

a photometric section which performs photometry on a plurality of photometric regions into which a photomerry field is divided, and which outputs brightness information from said photometric regions;

a follow up target recognizing section which recognizes as a follow up target an object in a predetermined follow up region within said photometric regions; and a follow up target detecting section that continues detecting a position of said follow up target in said photometric regions based on brightness information of said follow up target that has been recognized by said follow up target recognizing section, and which predicts a next position of said follow up target when no follow up target can be detected by said follow up target detecting section.

36. A camera having a target follow up function according to claim 35, wherein said photometric regions of said photometric section correspond to a photographic field of said camera.

37. A camera having a target follow up function, comprising:

a photometric section which performs photometry on a plurality of photometric regions into which a photometry field is divided, and which outputs brightness information from said photometric regions;

a follow up target recognizing section which recognizes as a follow up target an object in a predetermined follow up region within said photometric regions; and a follow up target detecting section that continues detecting a position of said follow up target in said photometric regions based on brightness information of said follow up target that has been recognized by said follow up target recognizing section, wherein said follow up target recognizing section recognizes a new follow up target when no follow up target can be detected by said follow up target detecting section.

38. A camera having a target follow up function according to claim 37, wherein said photometric regions of said photometric section correspond to a photographic field of said camera.

39. A camera having a target follow up function, comprising:

a photometric section which performs photometry on a plurality of photometric regions into which a photometry field is divided, and which outputs a brightness information from said photometric regions;

a follow up target recognizing section which recognizes as a follow up target an object in a predetermined follow up region within said photometric regions; and a follow up target detecting section that continues detecting a position of said follow up target in said photometric regions based on brightness information of said follow up target that has been recognized by said follow up target recognizing section, and that stands by at a position where detecting of said follow up target became impossible in said follow up target detecting section until said detecting of said follow up target becomes possible.

40. A camera having a target follow up function according to claim 39, wherein said photometric regions of said photometric section correspond to a photographic field of said camera.

* * * * *